(12) United States Patent  
Chen et al.

(10) Patent No.: US 10,602,199 B2
(45) Date of Patent: Mar. 24, 2020

(54) VIDEO SHARING METHOD AND DEVICE, AND VIDEO PLAYING METHOD AND DEVICE

(71) Applicant: TENCENT TECHNOLOGY (SHENZHEN) COMPANY LIMITED, Shenzhen, Guangdong (CN)

(72) Inventors: Junfeng Chen, Guangdong (CN); Na Zhao, Guangdong (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 0 days.

(21) Appl. No.: 15/729,439

(22) Filed: Oct. 10, 2017

(65) Prior Publication Data
US 2018/0035137 A1 Feb. 1, 2018

Related U.S. Application Data

(63) Continuation of application No. PCT/CN2016/085994, filed on Jun. 16, 2016.

(30) Foreign Application Priority Data

Jul. 27, 2015 (CN) .......................... 2015 1 0446684
Jul. 27, 2015 (CN) .......................... 2015 1 0448280
Aug. 18, 2015 (CN) .......................... 2015 1 0507128

(51) Int. Cl.
H04N 21/222 (2011.01)
H04N 21/458 (2011.01)
(Continued)

(52) U.S. Cl.
CPC ..... *H04N 21/2223* (2013.01); *H04N 21/2343* (2013.01); *H04N 21/2743* (2013.01);
(Continued)

(58) Field of Classification Search
CPC ........... H04N 21/252; H04N 21/23439; H04N 21/21; H04N 21/2662; H04N 21/4788;
(Continued)

(56) References Cited

U.S. PATENT DOCUMENTS 10,061,482 B1* 8/2018 Bingham ......... H04N 21/47205
2002/0056123 A1* 5/2002 Liwerant ............... H04M 3/567
725/87

(Continued)

FOREIGN PATENT DOCUMENTS

CN 102510533 A 6/2012
CN 102802079 A 11/2012
(Continued)

OTHER PUBLICATIONS

International Search Report dated Aug. 26, 2016 for International Application No. PCT/CN2016/085994, 2 pages.
(Continued)

Primary Examiner — Cynthia M Fogg
(74) Attorney, Agent, or Firm — Knobbe, Martens, Olson & Bear, LLP

(57) ABSTRACT

Embodiments of video sharing method, a video playing method, a video sharing device and a video playing device are disclosed. In some embodiments, the video sharing method includes: acquiring a video segment; acquiring a remark trigger position corresponding to play progress of the video segment; acquiring remark content corresponding to the remark trigger position; and sharing the video segment, the remark trigger position and the remark content with a receiving terminal, where the remark content is displayed in a playing picture of the video segment or is played in a form of sound when the receiving terminal plays the video segment to the remark trigger position.

17 Claims, 22 Drawing Sheets

(51) Int. Cl.
    *H04N 21/845*     (2011.01)
    *H04N 21/414*     (2011.01)
    *H04N 21/4788*     (2011.01)
    *H04N 21/8545*     (2011.01)
    *H04N 21/2743*     (2011.01)
    *H04N 21/2343*     (2011.01)

(52) U.S. Cl.
    CPC ..... *H04N 21/41407* (2013.01); *H04N 21/458* (2013.01); *H04N 21/4788* (2013.01); *H04N 21/8456* (2013.01); *H04N 21/8545* (2013.01)

(58) Field of Classification Search
    CPC ......... H04N 21/44204; H04N 21/2187; H04N 21/4126; H04N 21/2223; H04N 21/8456; H04N 21/2743; H04N 21/8545; H04N 21/41407; H04N 21/2343; H04N 21/458
    USPC ......... 725/106, 12, 80, 87, 109, 32, 37, 131, 725/139, 46, 90, 135, 116
    See application file for complete search history.

(56) References Cited

U.S. PATENT DOCUMENTS

| | | | |
|---|---|---|---|
| 2005/0035886 A1* | 2/2005 | Labelle | H04N 21/2402 341/51 |
| 2006/0111918 A1* | 5/2006 | Ducheneaut | G11B 27/10 704/278 |
| 2007/0174774 A1* | 7/2007 | Lerman | G11B 27/034 715/723 |
| 2010/0023553 A1* | 1/2010 | Gausman | G06F 16/48 707/E17.009 |
| 2013/0282611 A1 | 10/2013 | Avedissian et al. | |
| 2014/0063174 A1* | 3/2014 | Junuzovic | G06Q 10/101 348/14.02 |
| 2015/0067739 A1 | 3/2015 | Kelley et al. | |
| 2015/0180820 A1 | 6/2015 | Lee et al. | |
| 2015/0294640 A1 | 10/2015 | Lei et al. | |
| 2016/0029093 A1 | 1/2016 | Li et al. | |

FOREIGN PATENT DOCUMENTS

| | | | |
|---|---|---|---|
| CN | 102905056 A | 1/2013 | |
| CN | 103152654 A | 6/2013 | |
| CN | 103414751 A | 11/2013 | |
| CN | 103747362 A | 4/2014 | |
| CN | 104079981 A | 10/2014 | |
| CN | 104159151 A | 11/2014 | |
| CN | 104159161 A | 11/2014 | |
| CN | 104168503 A | 11/2014 | |
| CN | 104618741 A | 5/2015 | |
| WO | 2011079477 A1 | 7/2011 | |
| WO | WO-2011079477 A1 * | 7/2011 | ............ H04L 51/32 |
| WO | 2015071490 A1 | 5/2015 | |

OTHER PUBLICATIONS

Office Action with Translation Issued for Chinese Application No. 201510448280.7 dated Mar. 26, 2019.

* cited by examiner

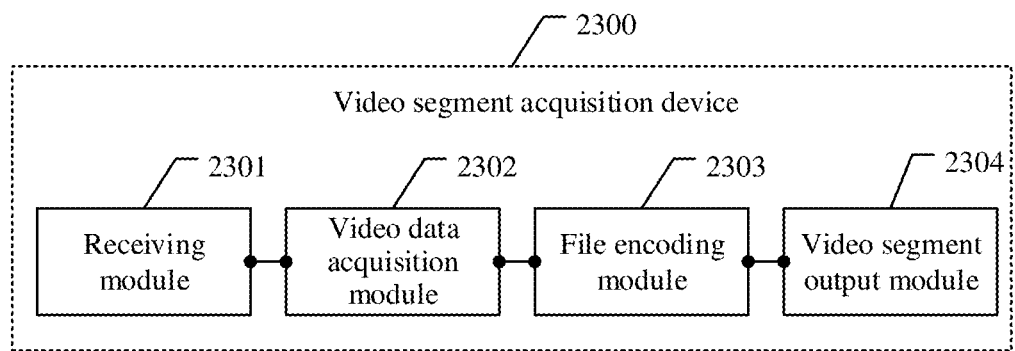
Figure 23-a
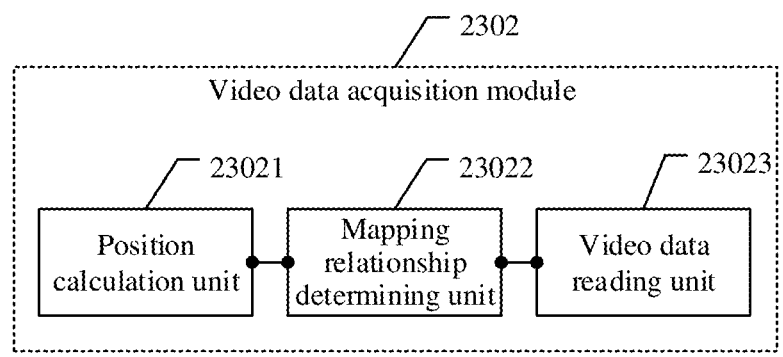
Figure 23-b

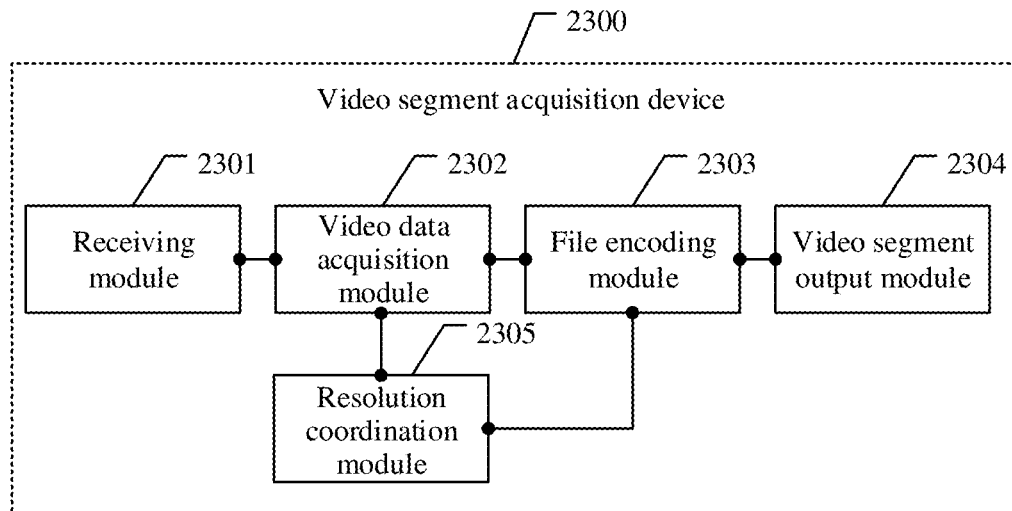
Figure 23-c
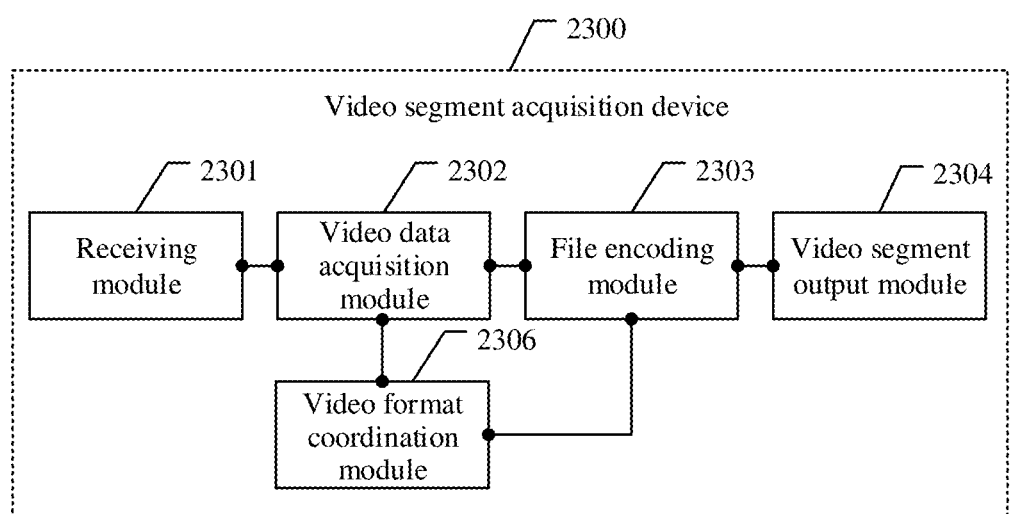
Figure 23-d

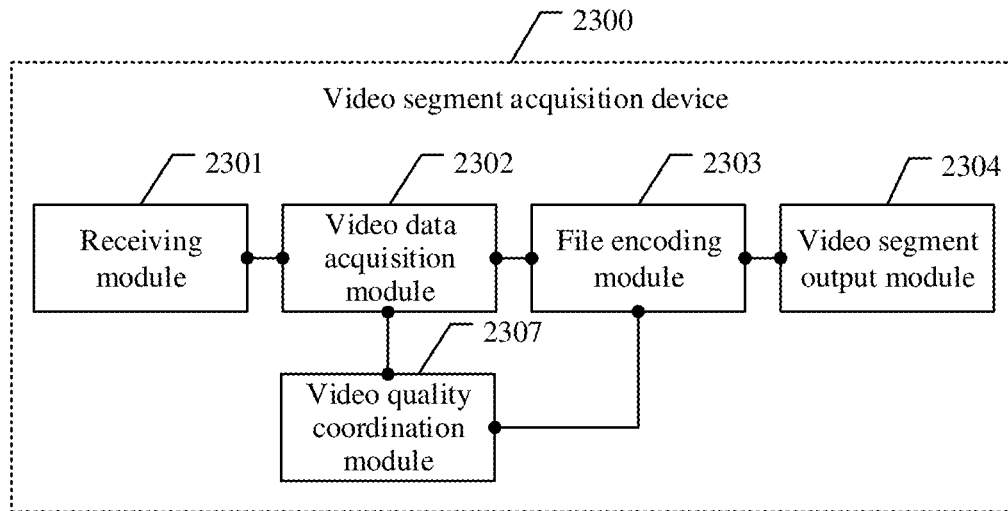
Figure 23-e
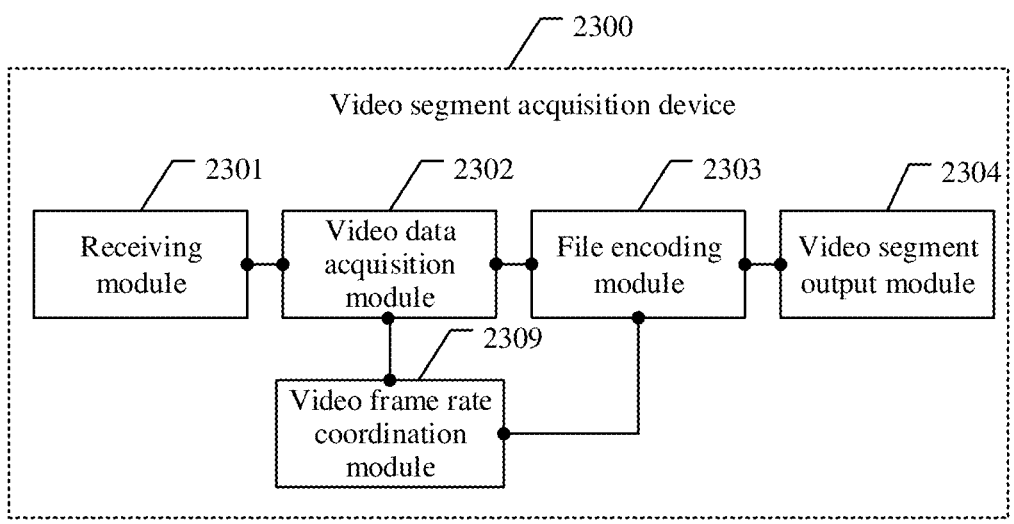
Figure 23-f

VIDEO SHARING METHOD AND DEVICE, AND VIDEO PLAYING METHOD AND DEVICE

The present application is a continuation of International Patent Application No. PCT/CN2016/085994, filed on Jun. 16, 2016, which claims priority to Chinese Patent Application No. 201510446684.2, titled "METHOD AND DEVICE FOR SEGMENTING VIDEO IMAGE" and filed with the Chinese State Intellectual Property Office on Jul. 27, 2015, priority to Chinese Patent Application No. 201510448280.7, titled "METHOD AND DEVICE FOR SEGMENTING VIDEO SEGMENT" and filed with the Chinese State Intellectual Property Office on Jul. 27, 2015, and priority to Chinese Patent Application No. 201510507128.1, titled "VIDEO SHARING METHOD AND DEVICE, AND VIDEO PLAYING METHOD AND DEVICE" and filed with the Chinese State Intellectual Property Office on Aug. 18, 2015, all of which are incorporated herein by reference in their entireties.

FIELD

The present disclosure relates to the field of internet, and particularly to a video sharing method, a video sharing device, a video playing method and a video playing device.

BACKGROUND

A social application is an application based on a social network. A user may establish a social relationship with a stranger or an acquaintance through the social application to become a network social contact, so that the user may transmit a message to the network social contact directly to communicate and interact with the network social contact directly. The user may also share an interesting video on a content sharing page of the social application, so that the network social contact having the network social relationship with the user may watch the video shared by the user when accessing to the content sharing page, thereby achieving an interaction between the user and the network social contact.

SUMMARY

A video sharing method, a video sharing device, a video playing method and a video playing device are provided according to embodiments of the present disclosure.

The video sharing method according to the embodiment of the present disclosure includes:
acquiring a video segment;
acquiring a remark trigger position corresponding to play progress of the video segment;
acquiring remark content corresponding to the remark trigger position; and
sharing the video segment, the remark trigger position and the remark content with a receiving terminal, where the remark content is displayed in a playing picture of the video segment or is played in a form of sound when the receiving terminal plays the video segment to the remark trigger position.

The video playing method according to the embodiment of the present disclosure includes:
acquiring a shared video segment, a remark trigger position and remark content corresponding to the video segment;
playing the video segment; and
displaying the remark content in a playing picture of the video segment or playing the remark content in a form of sound when play progress of the video segment reaches the remark trigger position.

The video sharing device according to the embodiment of the present disclosure includes a processor and a storage medium storing computer executable instructions, when the processor executes the computer executable instructions, the processor performs operations including:
acquiring a video segment;
acquiring a remark trigger position corresponding to play progress of the video segment;
acquiring remark content corresponding to the remark trigger position; and
sharing the video segment, the remark trigger position and the remark content with a receiving terminal, where the remark content is displayed in a playing picture of the video segment or is played in a form of sound when the receiving terminal plays the video segment to the remark trigger position.

The video playing device according to the embodiment of the present disclosure includes a processor and a storage medium storing computer executable instructions, when the processor executes the computer executable instructions, the processor performs operations including:
acquiring a shared video segment, a remark trigger position and remark content corresponding to the video segment;
playing the video segment; and
displaying the remark content in a playing picture of the video segment or playing the remark content in a form of sound when play progress of the video segment reaches the remark trigger position.

BRIEF DESCRIPTION OF THE DRAWINGS

FIG. 23-$a$ is a schematic diagram showing a structure of a terminal according to an embodiment of the present disclosure;

FIG. 23-$b$ is a schematic diagram showing a structure of a video data acquisition module according to an embodiment of the present disclosure;

FIG. 23-$c$ is a schematic diagram showing a structure of another video segment segmenting device according to an embodiment of the present disclosure;

FIG. 23-$d$ is a schematic diagram showing a structure of another video segment segmenting device according to an embodiment of the present disclosure;

FIG. 23-$e$ is a schematic diagram showing a structure of another video segment segmenting device according to an embodiment of the present disclosure;

FIG. 23-$f$ is a schematic diagram showing a structure of another video segment segmenting device according to an embodiment of the present disclosure.

DETAILED DESCRIPTION OF EMBODIMENTS

Figure 1:
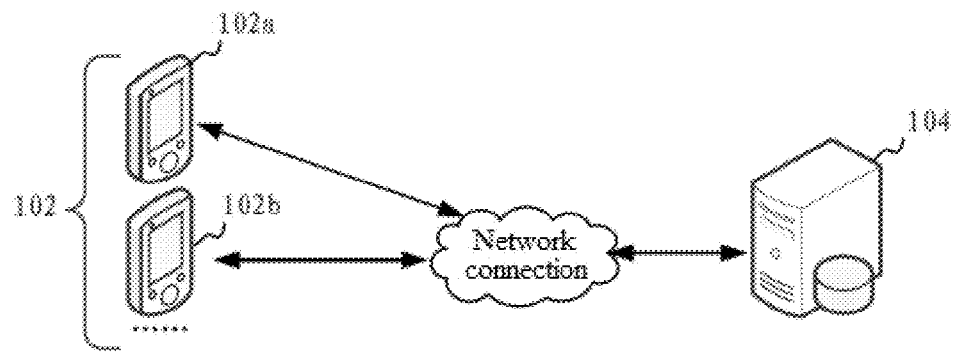
FIG. 1 is a diagram showing an application environment of a video interaction system based on a social network according to an embodiment of the present disclosure.

As shown in FIG. 1, a video interaction system based on a social network is provided in an embodiment, which includes at least two terminal 102 (a terminal 102$a$ and a terminal 102$b$ shown in FIG. 1) and a server 104. The terminal 102 is connected to the server 104 over a network. The terminal 102 may be a desktop computer or a mobile terminal. The mobile terminal includes at least one of a mobile phone, a tablet computer and a personal digital assistance (PDA). The server 104 may be an independent physical server or a server cluster including multiple physical servers.

Figure 2:
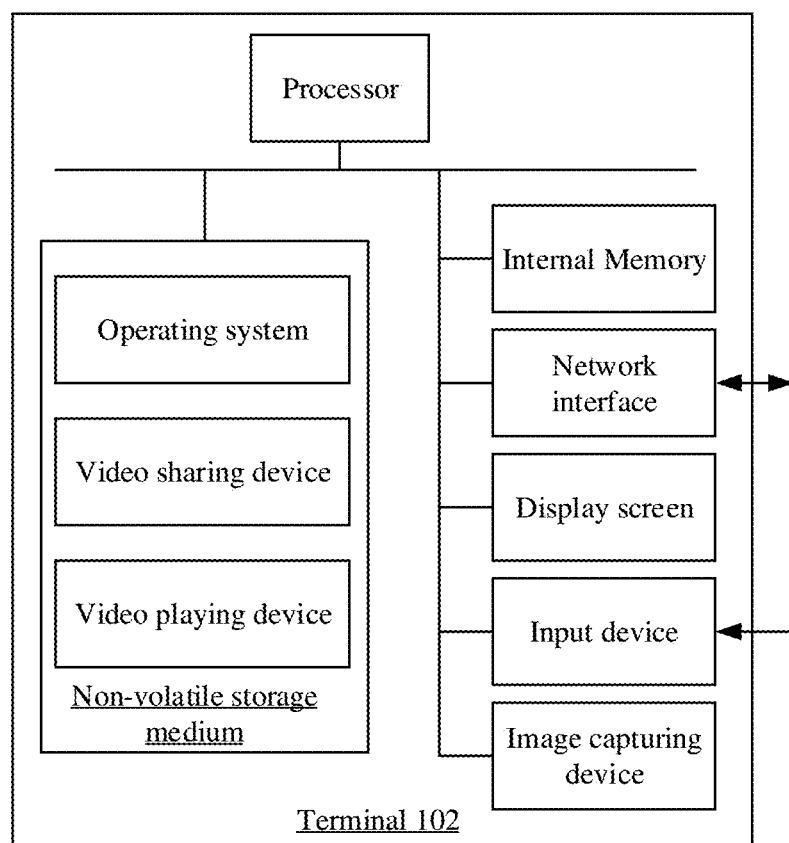
FIG. 2 is a schematic structural diagram of a terminal according to an embodiment of the present disclosure.

As shown in FIG. 2, in an embodiment, the terminal 102 includes a processor, a non-volatile storage medium, an internal memory, a network interface, a display screen, an input device and an image capturing device connected by a system bus. The processor has a calculation function and a function for controlling the terminal 102 to operate. The processor is configured to perform a video sharing method and/or a video playing method. The non-volatile storage medium includes at least one of a magnetic storage medium, an optical storage medium and a flash storage medium. The non-volatile storage medium stores an operating system and a video sharing device and/or a video playing device. The video sharing device is configured to perform a video sharing method, and the video playing device is configured to perform a video playing method. The network interface is configured to connect to a network and communicate with the server 104. The display screen includes at least one of a liquid crystal display screen, a flexible display screen and an electronic ink display screen. The input device includes at least one of a physical button, a trackball, a touch panel, and a touch layer overlapping with the display screen. The touch layer combines with the display screen to form a touch screen. The image capturing device is configured to capture an image in a real-time manner.

Figure 3:
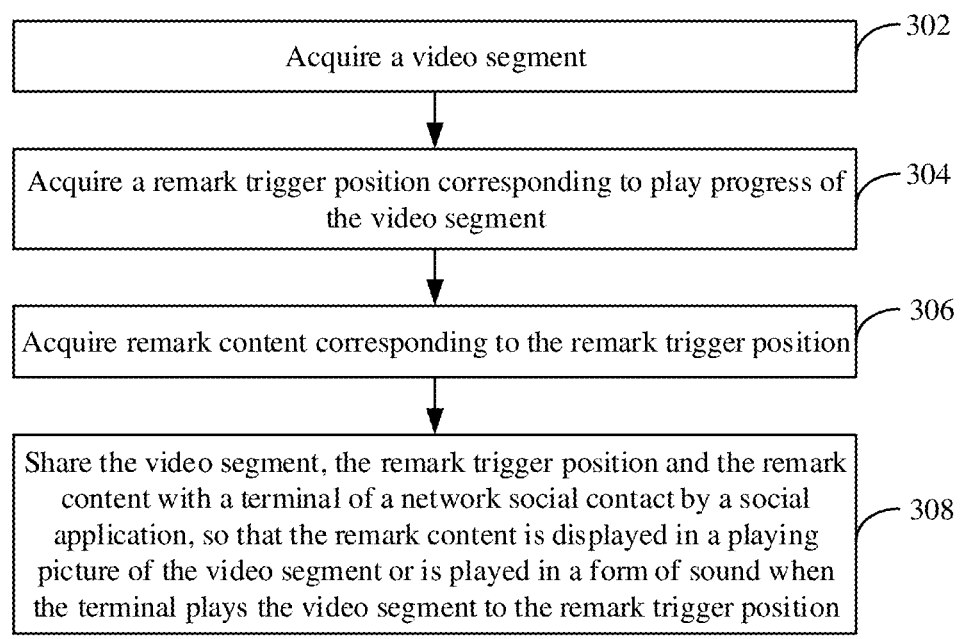
FIG. 3 is a schematic flowchart of a video sharing method according to an embodiment of the present disclosure.

As shown in FIG. 3, a video sharing method is provided in an embodiment. In the embodiment, it is illustrated by assuming that the method is applied to the terminal 102$a$ in the video interaction system based on the social network in FIG. 1. The method includes block 302 to block 308 in the following.

In block 302, a video segment is acquired.

The mobile terminal 102$a$ may acquire the video segment through a social application. The social application may be an independent application running on the mobile terminal 102$a$, or may be a webpage application or a light application accessed through an application with a webpage browsing function. The application with the webpage browsing function may be a web browser, for example.

The social application refers to an application which may provide a real-time or asynchronous information interaction mode based on a social network for a user. The real-time information interaction mode may be instant messaging for example, and the asynchronous information interaction mode may be content sharing for example. Video data may have various kinds of video formats, including at least one of AVI, RMVB, 3GP, MKV, MPEG, MPG, DAT and MP4.

In block 304, a remark trigger position corresponding to play progress of the video segment is acquired.

The terminal 102$a$ may provide a remark trigger position input box corresponding to the video segment by the social application, and acquire information inputted in the remark trigger position input box as the remark trigger position.

The remark trigger position is a position where it is triggered to present corresponding remark content. The remark trigger position corresponding to play progress of the video segment indicates that the play progress of the video segment may be located according to the remark trigger position, and one or more video frames may be located.

The remark trigger position may be indicated as a period of time from a playing start point of the video segment to the remark trigger position, or a ratio of the period of time from the playing start point of the video segment to the remark trigger position to a total playing time period of the video segment.

In an embodiment, the remark trigger position may also be indicated as a serial number of a playing period generated by dividing the video segment according to a predetermined period of time. The video segment may be divided into multiple playing periods according to the predetermined period of time and serial numbers are assigned for the multiple playing periods. For example, one playing period is generated every two seconds, and serial numbers are assigned sequentially from 0. In a case where the remark trigger position is indicated as 2, it refers to a playing period ranging from a fourth second to a sixth second with respect to the playing start point of the video segment.

In block 306, remark content corresponding to the remark trigger position is acquired.

The remark content indicates information generated by a user and is to be attached to the video segment. In an embodiment, the remark content includes at least one of a visual element and audio data. The visual element includes at least one of a graphic marker, a text, and an icon. The visual element indicates an element which may be observed by human eyes, the graphic marker is a marker which is made in a playing picture of video data by means of graphics. The icon includes a static icon, such as a static expression icon, and a dynamic icon, such as an expression animation icon.

The terminal 102a may provide a remark content input box corresponding to the remark trigger position, and acquire a text inputted in the remark content input box as the remark content corresponding to the remark trigger position, or acquire an icon identifier inputted in the remark content input box to take an icon corresponding to the icon identifier as the remark content corresponding to the remark trigger position.

In an embodiment, the terminal 102a may provide an audio data acquisition control corresponding to the remark trigger position, and triggers to acquire audio data corresponding to the remark trigger position when an operation on the audio data acquisition control is detected. The audio data may be formed by collecting environmental sound in a real-time manner, or may be selected from a file catalog. Thus, the remark trigger position may be used to limit a display time period of the remark content.

In block 308, the video segment, the remark trigger position and the remark content are shared with a terminal of a network social contact via a social application, so that the remark content is displayed in a playing picture of the video segment or is played in a form of sound when the terminal plays the video segment to the remark trigger position.

The network social contact indicates a user having a social relationship based on the social network with a user of the terminal 102a. The social relationship may be a friend relationship, a colleague relationship, a schoolmate relationship or a group member relationship.

The terminal 102a uploads the video segment and the remark trigger position and the remark content corresponding to the video segment to the server 104 via the social application, such that the server 104 transmits the video segment and the remark trigger position and the remark content corresponding to the video segment to the terminal 102b automatically or when the server 104 receives a pulling request from the terminal 102b. The terminal 102b is a terminal of a network social contact having a social relationship based on the social network with the user of the terminal 102a.

The terminal 102b may play the video segment on a content sharing page of the terminal 102b automatically or under trigger of the user, after receiving the video segment. When play progress of the video segment reaches the remark trigger position, the terminal 102b displays the remark content corresponding to the remark trigger position in a playing picture of the video segment. Specifically, remark content of a visual element corresponding to the remark trigger position is displayed in the playing picture of the video segment. Alternatively, when the play progress of the video segment reaches the remark trigger position, the terminal 102b plays the remark content corresponding to the remark trigger position in a form of sound. Specifically, remark content of audio data corresponding to the remark trigger position is played in the form of sound.

With the video sharing method described above, the video segment is acquired and the remark trigger position and the remark content corresponding to the video segment are acquired. Thus, in a case where the video segment, the remark trigger position and the remark content are shared with the terminal of the network social contact, the terminal may play the remark content when play progress of the video segment reaches the remark trigger position. In this way, the user may transmit the information attached to the video by means of remark, the remark trigger position is accurately combined with the play progress of the video, and further the remark trigger position is combined with the specific content of the video, so that the information can be transferred more effectively.

Figure 4:
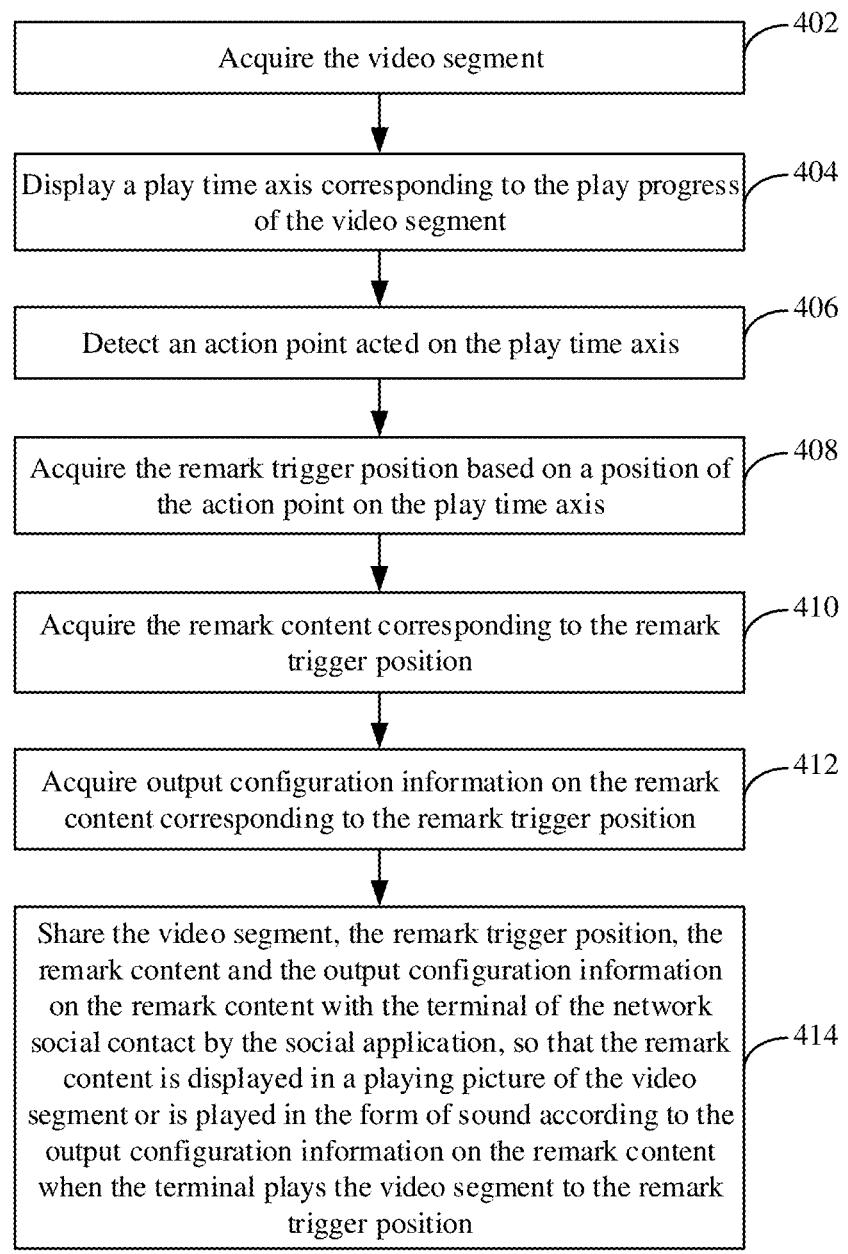
FIG. 4 is a schematic flowchart of another video sharing method according to an embodiment of the present disclosure.

As shown in FIG. 4, in an embodiment, a video sharing method is provided, which includes block 402 to block 414 in the following.

In block 402, a video segment is acquired.

In an embodiment, block 402 includes: acquiring a video recording instruction, and capturing images to form a video segment in response to the video recording instruction. The mobile terminal 102a may provide a video recording trigger control through a social application and trigger the video recording instruction when detecting an operation on the video recording trigger control. The operation may be at least one of a click, a double click, long pressing and a slide along a preset track. The mobile terminal 102a may invoke a system camera application to capture images by an image capturing device to form the video segment, in response to the video recording instruction.

Figure 5:
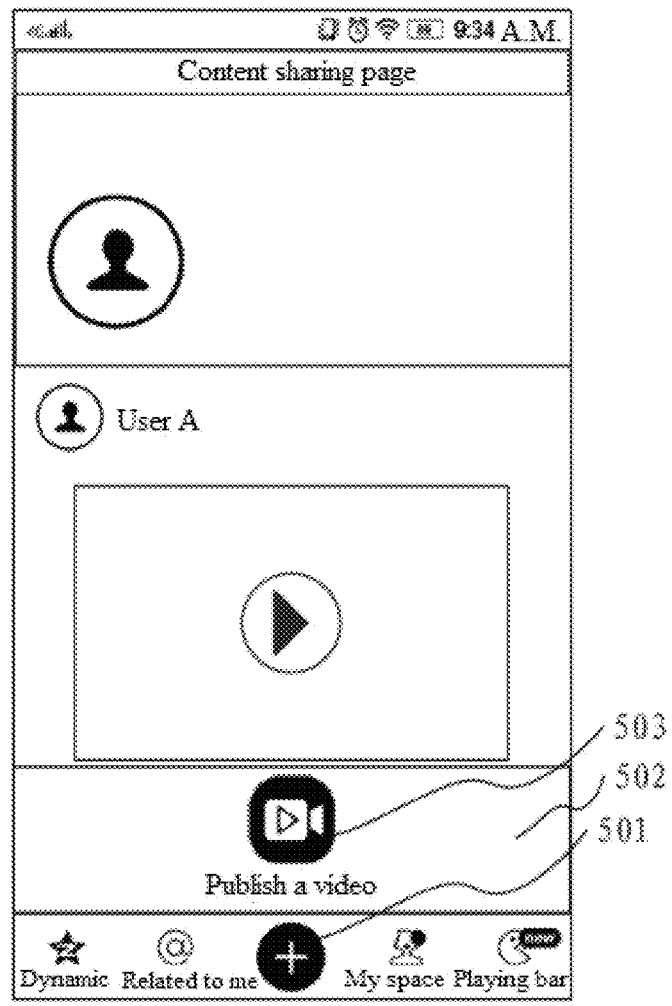
FIG. 5 shows a content sharing page of a social application according to an embodiment of the present disclosure.

For example, the mobile terminal 102a may display a content sharing page shown in FIG. 5 through the social application and display a publishing toolbar 502 when detecting an operation on a content publishing control in the content sharing page. A video publishing control 503 is displayed in the publishing toolbar 502. The mobile terminal 102a may enter a video segment acquisition page shown in FIG. 6 when detecting an operation on the video publishing control 503. The mobile terminal 102a may detect an operation on a video recording trigger control 601 in the video segment acquisition page and trigger the video recording instruction, thereby capturing images to form the video segment in response to the video recording instruction. The mobile terminal 102a may display the captured images in a preview area 602 of the video data acquisition page in a real-time manner.

In an embodiment, block 402 includes: acquiring a video segment selection instruction, and selecting the video segment from a local file catalog in response to the video segment selection instruction. The mobile terminal 102a may provide a video segment selection trigger control through the social application, such as a video segment selection trigger control 603 in the video segment acquisition page shown in FIG. 6, and trigger the video segment selection instruction when detecting an operation on the video segment selection trigger control. The operation may be at least one of a click, a double click, long pressing and a slide along a preset track.

In block 404, a play time axis corresponding to play progress of the video segment is displayed.

Figure 6:
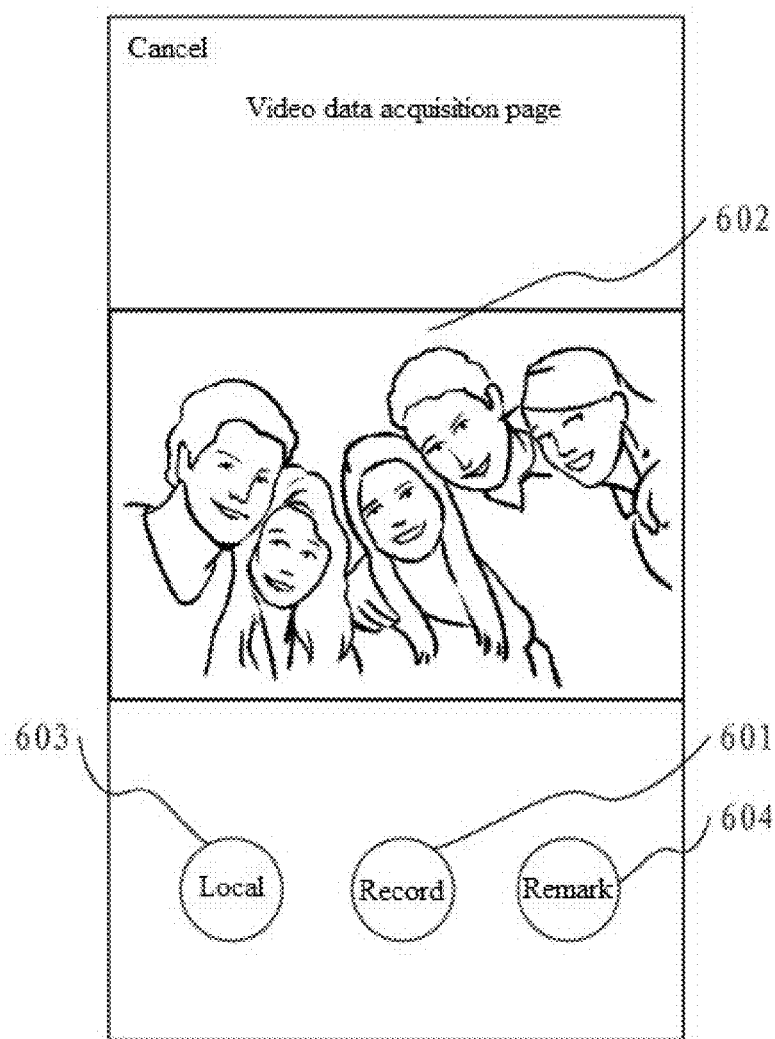
FIG. 6 is a schematic diagram of a video segment acquisition page of a social application according to an embodiment of the present disclosure.
Figure 7:
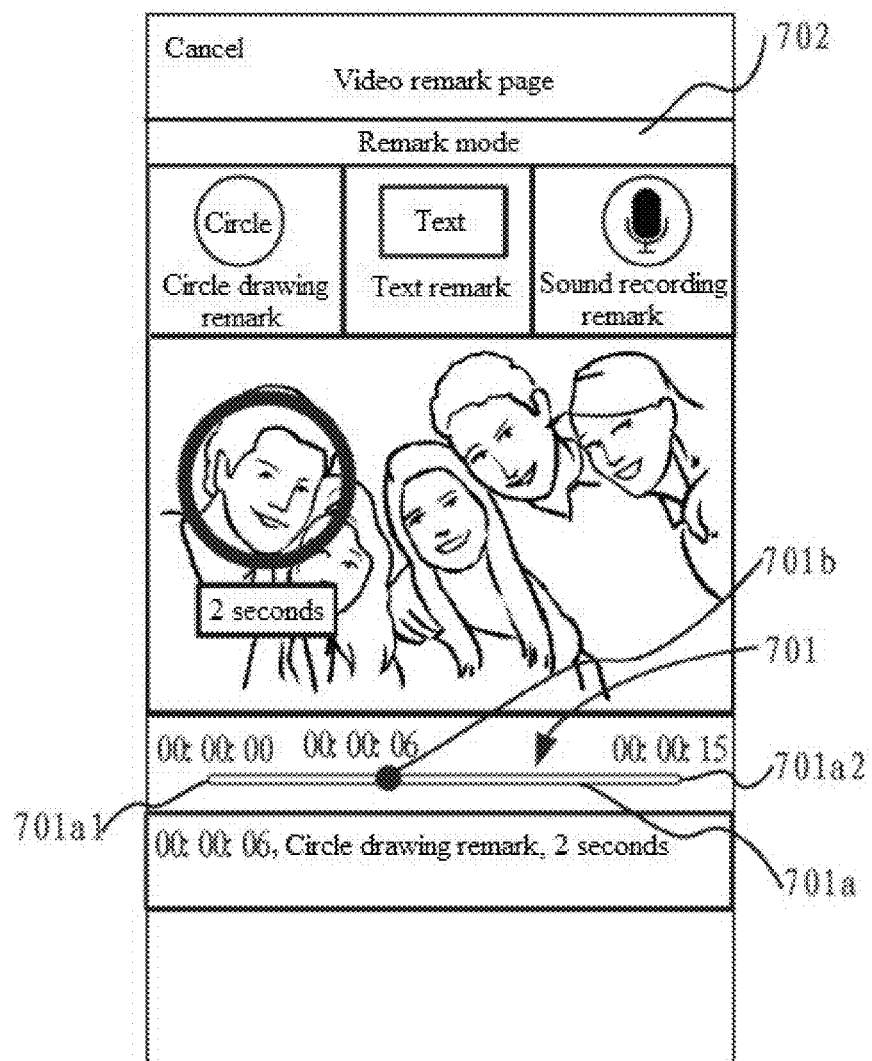
FIG. 7 shows a video remark page of a social application according to an embodiment of the present disclosure.

Referring to FIG. 6, the terminal 102a triggers to enter a video remark page shown in FIG. 7 when detecting an operation on a remark trigger control 604 in the video segment acquisition page. The play time axis corresponds to the play progress of the video segment, and may be used to control the play progress of the video segment. Referring to a play time axis 701 in the video remark page shown in FIG. 7, the play time axis 701 has a time scale bar 701a and a play time stamp 701b. The time scale bar 701a has a playing start point scale 701a1 and a playing end point scale 701a2. The play time stamp 701b may move along the time scale bar 701a and is used to mark the current play progress of the video segment. The play time axis is a straight line segment in FIG. 7, and the play time axis may be a curve segment or a broken line segment in other embodiment. The curve segment or the broken line segment can increase accuracy. The play time axis may be displayed as a straight line segment by default and change to a curve segment or a broken line segment during the operation.

In block 406, an action point acted on the play time axis is detected.

In a case where the terminal 102a has a touch screen, the action point acted on the play time axis may be a touch point acted on the play time axis. In a case where an input device of the terminal 102a is a mouse, the terminal 102a may use a detected clicking point on the play time axis from a cursor of the mouse as the action point acted on the play time axis. The terminal 102a may also acquire a direction instruction to move a position of the action point on the play time axis 701, thereby detecting the action point with a changed position. After the action point is detected, the play time stamp 701b is displayed at the action point. The position of the action point may be determined based on a position of the play time stamp 701b.

In block 408, a remark trigger position is acquired based on a position of the action point on the play time axis.

When detecting the action point acted on the play time axis 701, the terminal 102a acquires the remark trigger position based on the position of the action point on the play time axis 701.

In an embodiment, in a case where the time scale bar 701a of the play time axis 701 is a straight line segment, the terminal 102a may obtain the remark trigger position according to a product of a total playing time period of the video data and a ratio of a length from the action point to the playing start point scale 701a1 to a total length from the playing start point scale 701a1 to the playing end point scale 701a2.

In an embodiment, in a case where the time scale bar 701a of the play time axis 701 is a curve segment, the terminal 102a may obtain the remark trigger position according to a product of the total playing time period of the video data and a ratio of a curve length from the action point to the playing start point scale 701a1 to a total curve length from the playing start point scale 701a1 to the playing end point scale 701a2.

The above blocks 404 to 408 are used to implement block 304.

In block 410, remark content corresponding to the remark trigger position is acquired.

In an embodiment, after block 402, the terminal 102a may acquire a remark mode selection instruction to select a corresponding remark mode on the basis of the remark mode selection instruction, and remark content corresponding to the remark trigger position is acquired on the basis of the selected remark mode. The remark mode includes a graphic marker remark mode, a text remark mode and a sound recording remark mode. The graphic marker remark mode includes a circle drawing remark mode which is a remark mode of marking in an image by a closed graph. The closed graph may be a circle, an oval and a polygon including a triangle, a rectangle and a pentagon. A bright color may be selected for the circle drawing mark, such as red, or the color of the circle drawing mark may be automatically matched based on a color of the playing picture.

Referring to FIG. 7, the terminal 102a provides a remark mode selection control 702 in the video remark page, and detects an operation on the remark mode selection control 702 to determine a corresponding remark mode. In a case where the remark mode is the circle drawing remark mode, the terminal 102a detects the operation in a playing picture of the video data to generate a circle drawing mark.

Figure 8:
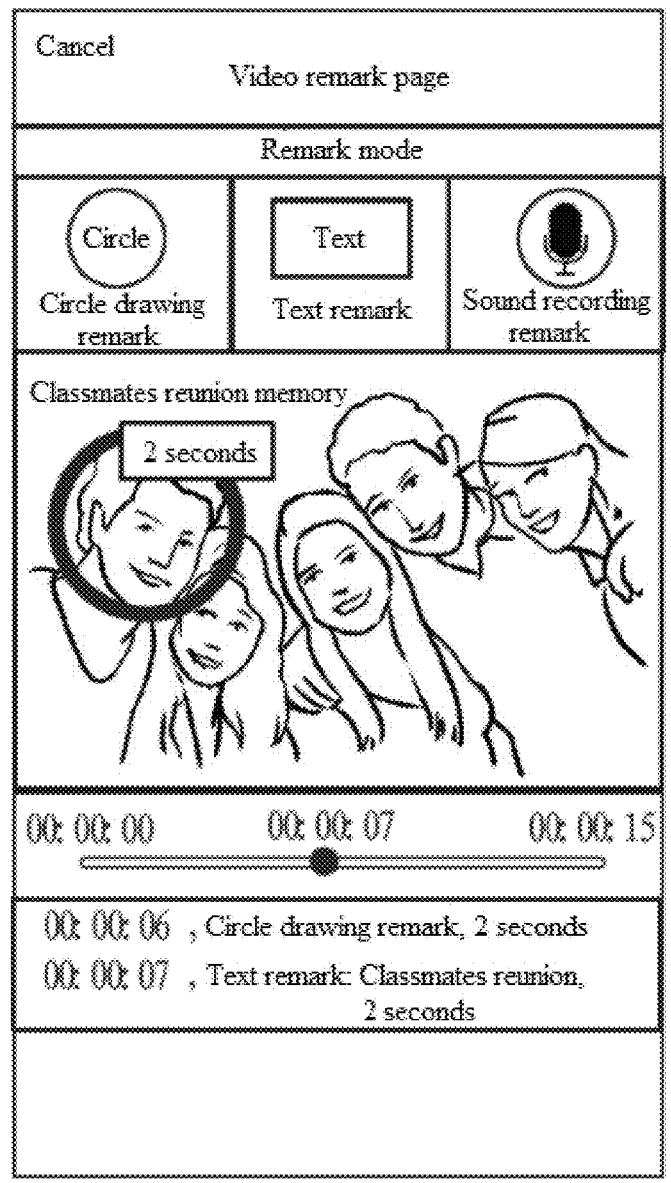
FIG. 8 shows another video remark page of the social application according to an embodiment of the present disclosure.
Figure 9:
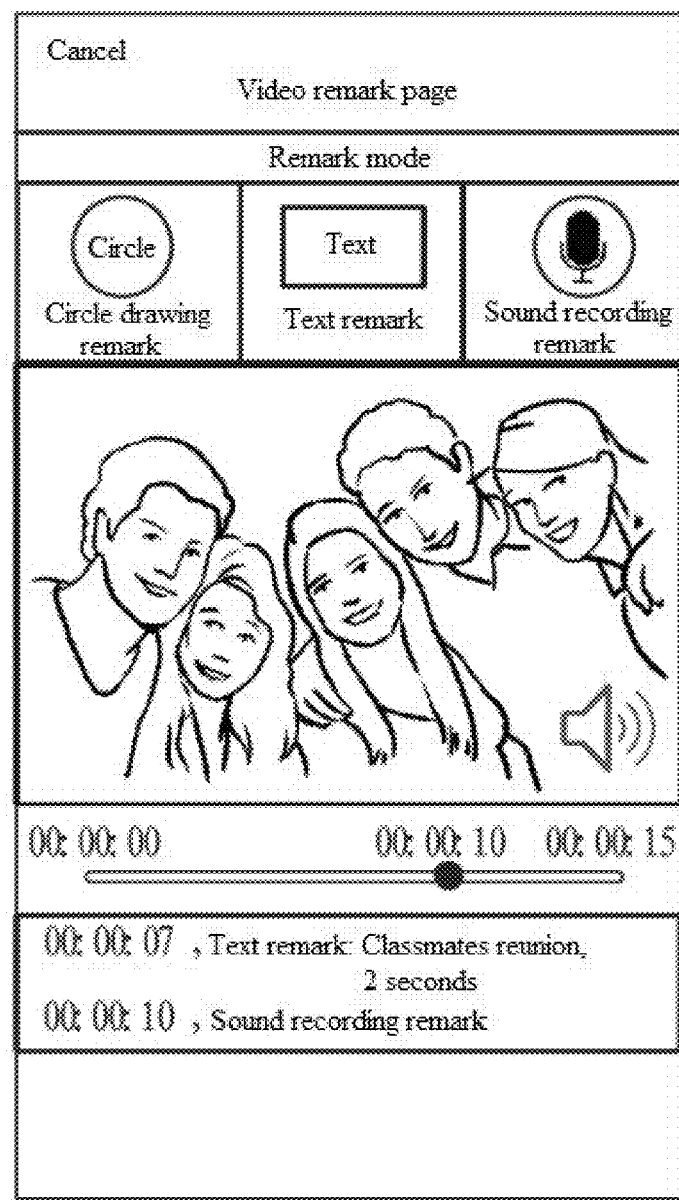
FIG. 9 shows another video remark page of the social application according to an embodiment of the present disclosure.

Referring to FIG. 8, in a case where the remark mode is the text remark mode, the terminal 102a detects an operation in a playing picture of the video segment to determine a text input area so as to acquire a text inputted in the text input area as the remark content. Referring to FIG. 9, in a case where the remark mode is the sound recording remark mode, the terminal 102a obtains remark content of an audio segment by collecting environmental sound.

In an embodiment, the terminal 102a may display a correspondence between the remark trigger position and the remark content in the video remark page, may further display a correspondence between the remark trigger position, the remark mode and the remark content.

In block 412, output configuration information on remark content corresponding to the remark trigger position is acquired.

The output indicates displaying or playing in a form of sound. The output configuration information on the remark content is configuration information for instructing how to display the remark content or how to play the remark content in the form of sound. Block 412 may be performed before block 410.

In an embodiment, in a case where the remark content includes a visual element, the output configuration information on the remark content includes a display position of the visual element in the playing picture of the video segment. The display position may be indicated as coordinates in a coordinate axis of the playing picture of the video segment, or may be indicated as distances from two adjacent sides of the playing picture of the video segment. In a case where the remark mode is the circle drawing remark mode and the terminal 102a detects an operation on the playing picture of the video segment to generate a circle drawing mark, the terminal 102a acquires a position where the operation is performed as a display position of the circle drawing mark. In a case where the remark mode is the text remark mode, the terminal 102a detects an operation on the playing picture of the video segment to determine a text input area, determines a display position of a text remark content based on a position where the operation is performed, and acquires a text inputted in the text input area as the remark content.

In an embodiment, the output configuration information on the remark content may further include an output time period for the remark content. The output time period for the remark content defines a time period during which the remark content is displayed in the playing picture or played in a form of sound. In a case where the remark content includes a visual element, the visual element displays in the playing picture for the output time period for the remark content; and in a case where the remark content includes audio data, the audio segment is played for the output time period for the remark content.

In block 414, the video segment, the remark trigger position, the remark content and the output configuration information on the remark content are shared with a terminal of a network social contact by the social application, so that the remark content is displayed in a playing picture of the video segment or is played in a form of sound according to the output configuration information on the remark content, when the terminal plays the video segment to the remark trigger position. Block 414 is used to implement block 308.

The terminal 102a uploads the video segment, a remark trigger position, remark content, and the output configuration information on the remark content corresponding to the video segment to the server 104 through a social application, such that the server 104 transmits the video segment, the remark trigger position, the remark content and the output configuration information on the remark content corresponding to the video segment to the terminal 102b automatically or when the server 104 receives a pulling request from the terminal 102b. The terminal 102b is a terminal of a network social contact having a social relationship based on the social network with a user of the terminal 102a.

The terminal 102b plays the video segment and displays a visual element in the playing picture of the video segment according to a display position of the visual element included in the output configuration information on the remark content. The terminal 102b controls a display time period of the visual element included in the remark content or a playing time period of audio data included in the remark content based on the output time period for the remark content included in the output configuration information on the remark content.

In the embodiment, the remark trigger position can be acquired accurately based on the play time axis, thereby accurately controlling the remark trigger position. An output mode of the remark content can be controlled according to the output configuration information on the remark content, such that the remark content is outputted in multiple forms. The remark content can be combined with the video segment content deeply by controlling the display position of the remark content, and the information can be transmitted more effectively.

Figure 10:
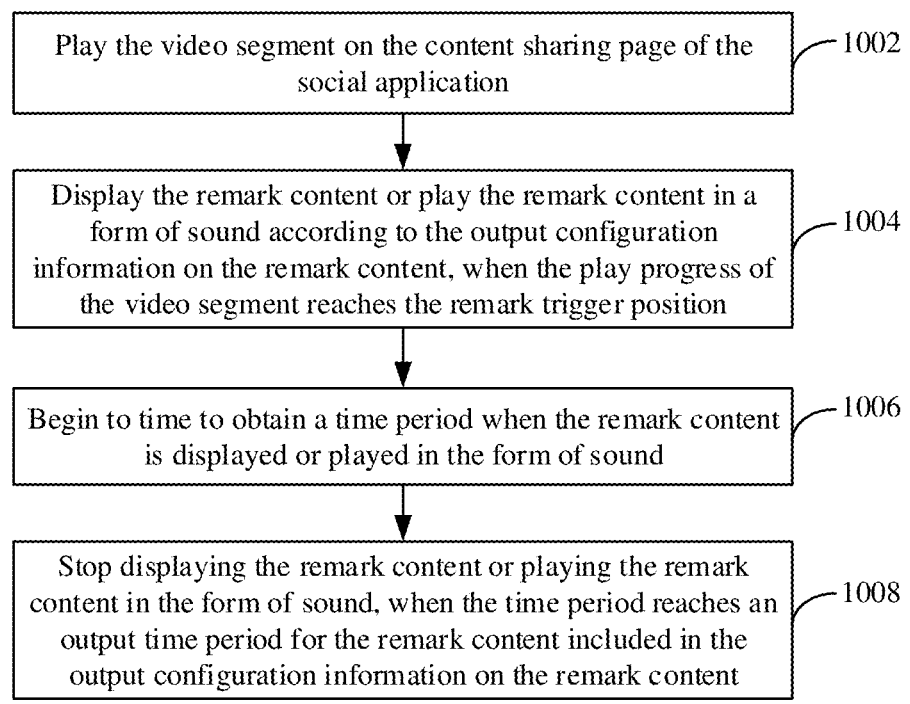
FIG. 10 is a schematic flowchart of an operation of locally outputting remark content according to an embodiment of the present disclosure.

As shown in FIG. 10, in an embodiment, the video sharing method further includes an operation of locally outputting the remark content. The operation includes blocks 1002 to 1008 in the following.

In block 1002, a video segment is played on a content sharing page of the social application.

Figure 11:
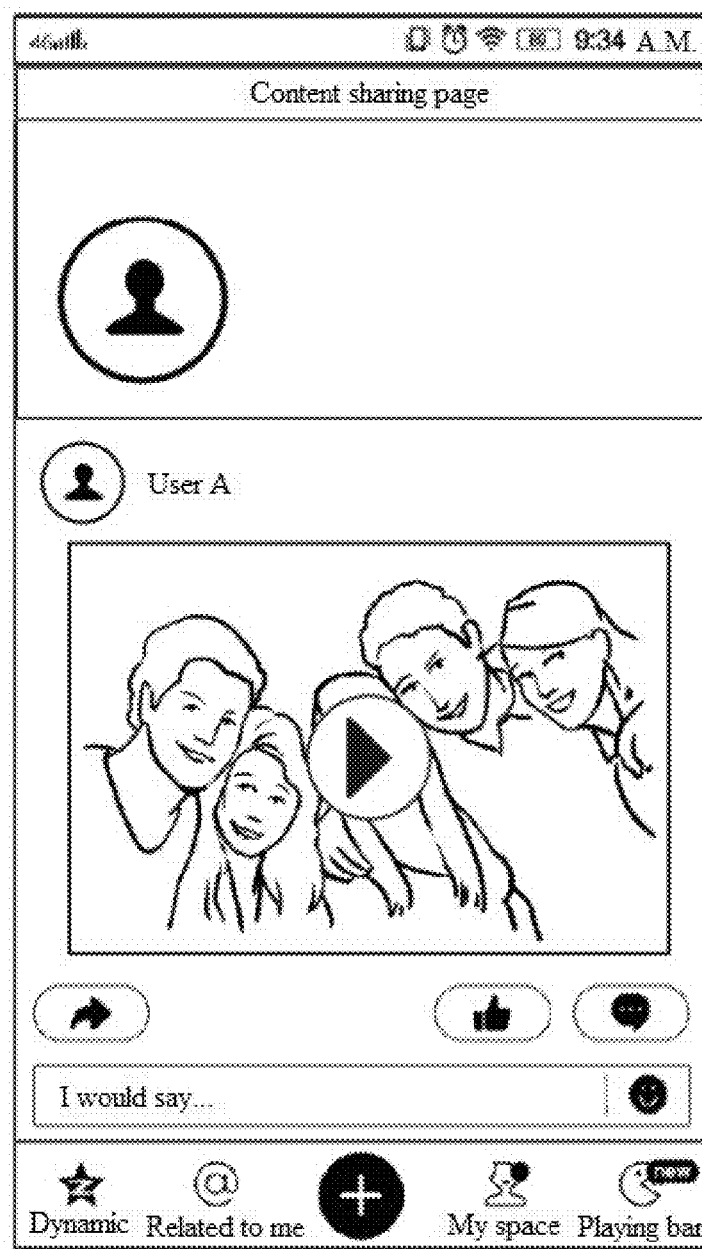
FIG. 11 shows another content sharing page of the social application according to an embodiment of the present disclosure.

After the user publishes the video, the shared video segment may be viewed in the content sharing page. The terminal 102a may play the video segment on the content sharing page of the social application automatically or when the terminal 102a detects a play instruction for the video segment. Referring to the content sharing page shown in FIG. 11, a content shared by the user is displayed in the content sharing page; and when the user clicks the shared video segment, the terminal 102a starts to play the video segment.

In block 1004, when play progress of the video segment reaches the remark trigger position, the remark content is displayed or is played in a form of sound according to the output configuration information on the remark content.

The terminal 102a displays a visual element according to a display position of the visual element included in the output configuration information on the remark content. The terminal 102a controls a display time period of the visual element included in the remark content or a playing time period of audio data included in the remark content according to an output time period for the remark content included in the output configuration information on the remark content.

In block 1006, it is begun to time to obtain a time period when the remark content is displayed or played in the form of sound.

In block 1008, when the time period reaches the output time period for the remark content included in the output configuration information on the remark content, the remark content is stopped displaying or playing in the form of sound.

Figure 12:
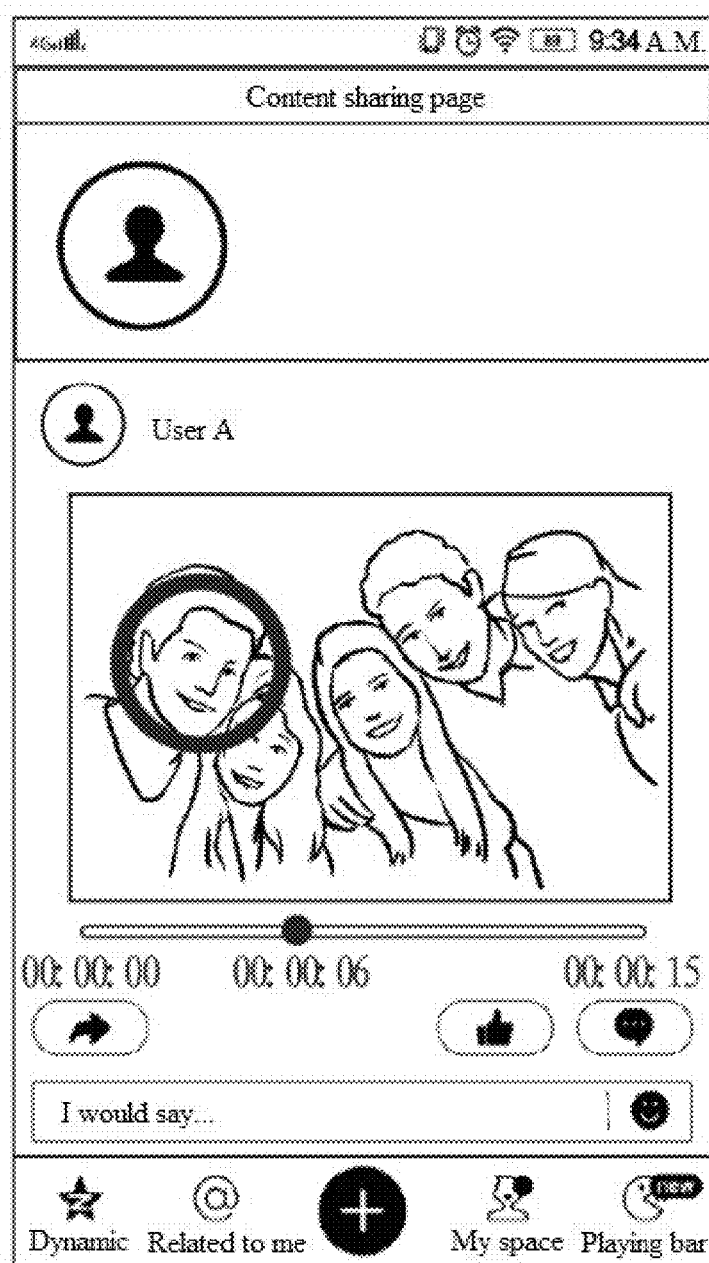
FIG. 12 shows another content sharing page of the social application according to an embodiment of the present disclosure.
Figure 13:
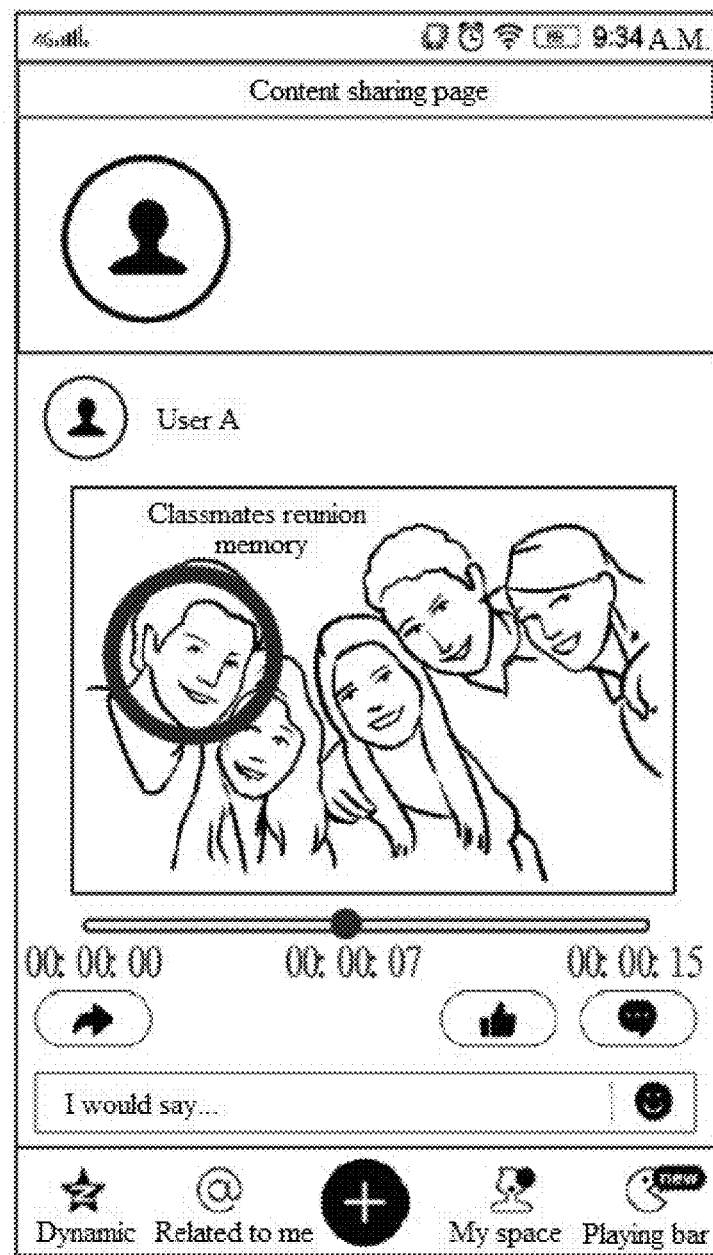
FIG. 13 shows another content sharing page of the social application according to an embodiment of the present disclosure.
Figure 14:
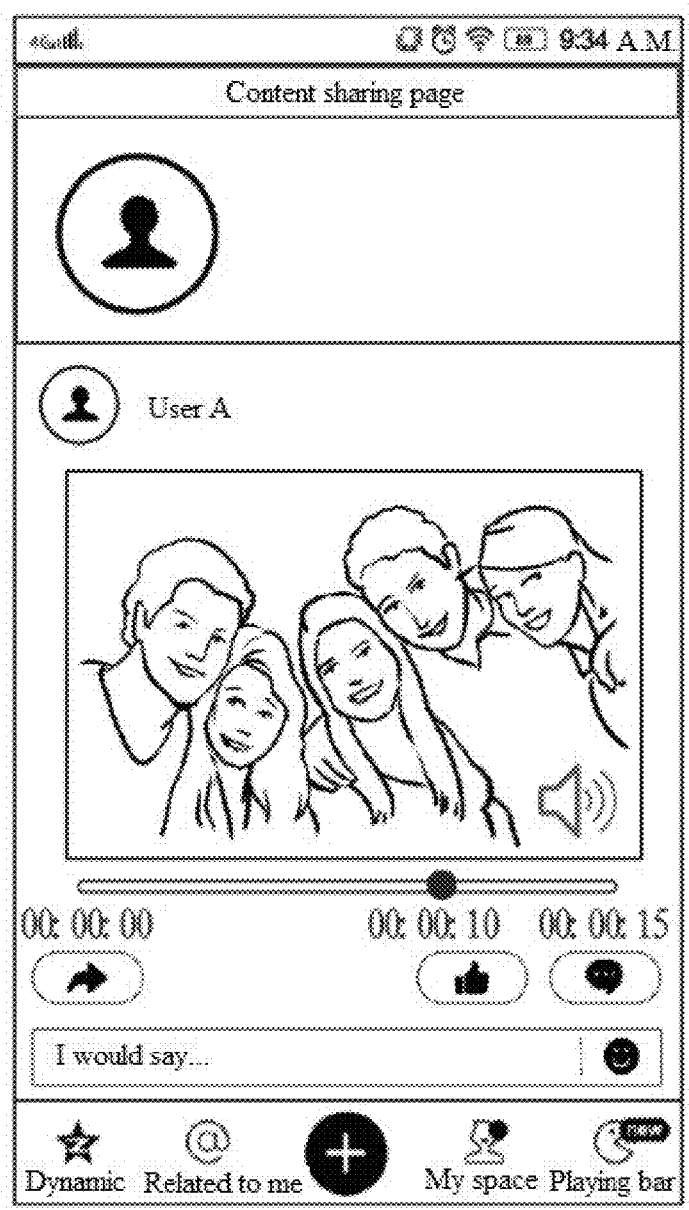
FIG. 14 shows another content sharing page of the social application according to an embodiment of the present disclosure.

Referring to FIG. 12, the remark trigger position marked by circle drawing is at the sixth second from a playing start point 0 of the video segment, thus the circle drawing mark is displayed at a display position marked by the circle drawing at the sixth second and it is begun to time to obtain a time period. An output time period for the remark content marked by the circle drawing is 2 seconds. Referring to FIG. 13, when the video segment is played to the seventh second, the time period does not reach 2 seconds, the circle drawing mark is still displayed, and remark content of a text at the seventh second is displayed. An output time period for the remark content of the text is 2 seconds. Referring to FIG. 14, when the video segment is played to the tenth second, displaying of the circle drawing mark and the text is stopped respectively at the eighth second and at the ninth second, and the remark content is started to be played in a form of audio data at the tenth second.

In the embodiment, the display time periods for different remark content may be controlled by controlling the output time periods for the different remark content, so as to coordinate the display time periods of the different remark content, thereby avoiding influencing a display effect or a playing effect of the different remark content due to display overlap of the different remark content.

Figure 15:
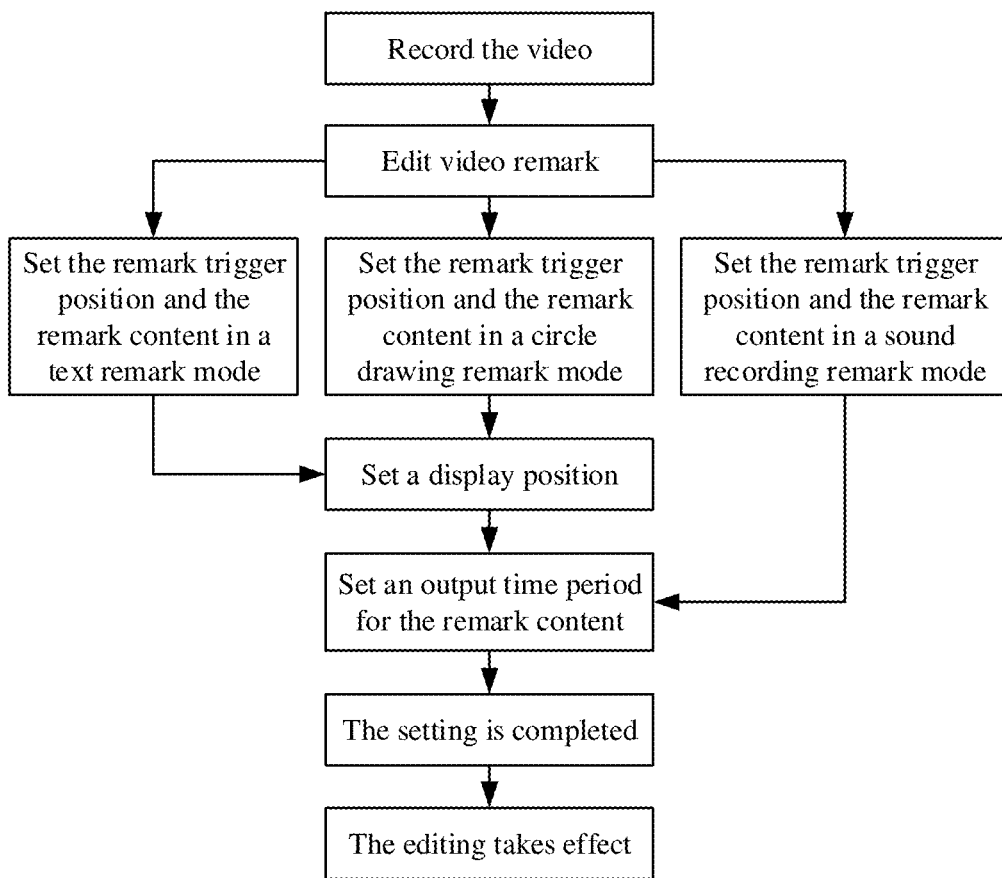
FIG. 15 is a schematic flowchart of an operation of editing a video remark by a user in an application scenario according to an embodiment of the present disclosure.

A principle of the video sharing method above is described by a specific application scenario. Referring to FIG. 15, after recording a video to obtain a video segment by the social application, the user triggers a video remark edit operation, selects at least one of a text remark mode, a circle drawing remark mode and a sound recording remark mode to perform a remark edit operation, sets remark content corresponding to the remark trigger position, sets display positions of a text and a circle drawing mark, and sets the output time period for the remark content, such that the remark edit operation takes effect. In this way, when the video is shared with a terminal of a network social contact, the terminal can display the remark content in a playing picture of the video segment or play the remark content in a form of sound when the terminal plays the video segment to the remark trigger position.

Figure 16:
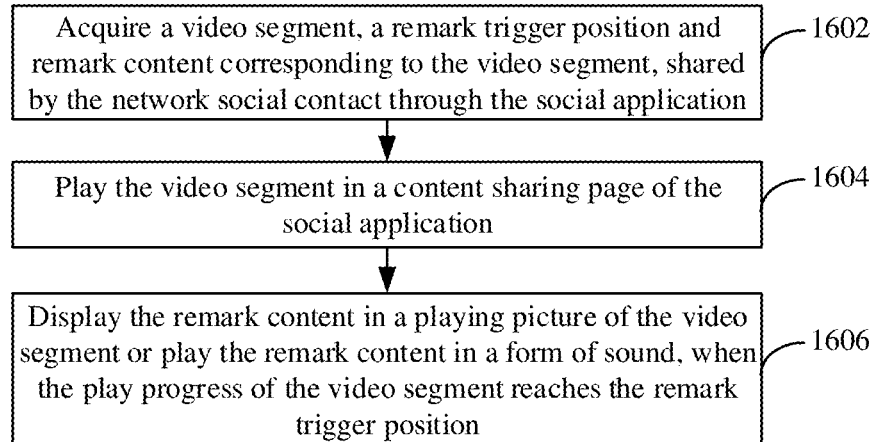
FIG. 16 is a schematic flowchart of a video playing method according to an embodiment of the present disclosure.

As shown in FIG. 16, a video playing method is provided in an embodiment. It is illustrated by assuming that the method is applied to the mobile terminal 102b in FIG. 1 in the embodiment. The method includes blocks 1602 to 1606 in the following.

In block 1602, a video segment, a remark trigger position and remark content corresponding to the video segment, shared by a network social contact through a social application are acquired.

The network social contact indicates a user having a social relationship based on a social network with a user of the terminal 102b. The social relationship may be, for example, a friendship relationship, a colleague relationship, a schoolmate relationship or a group member relationship.

The terminal 102a uploads the video segment and the remark trigger position and the remark content corresponding to the video segment to the server 104 through a social application, such that the server 104 transmits the video segment and the remark trigger position and the remark content corresponding to the video segment to the terminal 102b automatically or when the server 104 receives a pulling request from the terminal 102b. The terminal 102b is a terminal of a network social contact having the social relationship based on the social network with a user of the terminal 102a.

In block 1604, the video segment is played in a content sharing page of the social application.

The terminal 102b may play the video segment in the content sharing page of the social application automatically or when the terminal 102b detects a play instruction for the video segment.

In block 1606, when play progress of the video segment reaches the remark trigger position, the remark content is displayed in a playing picture of the video segment or is played in a form of sound.

When the play progress of the video segment reaches the remark trigger position, the terminal 102b displays remark content corresponding to the remark trigger position in the playing picture of the video segment. Specifically, remark content of a visual element corresponding to the remark trigger position is displayed in the playing picture of the video segment. Alternatively, when the play progress of the video segment reaches the remark trigger position, the terminal 102b plays the remark content corresponding to the remark trigger position in a form of sound. Specifically, remark content of audio data corresponding to the remark trigger position is played in the form of sound.

With the above video playing method, the network social contact shares the video segment, the remark trigger position and the remark content corresponding to the video segment through the social application. In a case where the video segment is played in the content sharing page of the social application, the remark content can be played when the play progress of the video segment reaches the remark trigger position. In this way, the network social contact can transmit information attached to the video by means of remark, the remark trigger position is accurately combined with the playing progress of the video, and further the remark trigger position is combined with the specific content of the video, so that the information can be transferred more effectively.

In an embodiment, block 1602 includes: acquiring a video segment, a remark trigger position, a remark content and output configuration information on the remark content corresponding to the video segment, shared by the network social contact through the social application. The process of displaying the remark content in the playing picture of the video segment or playing the remark content in the form of sound in block 1606 includes: displaying the remark content in the playing picture of the video segment or playing the remark content in the form of sound according to the output configuration information on the remark content.

The output indicates displaying or playing in the form of sound, the output configuration information on the remark content is configuration information for instructing how to display the remark content or how to play the remark content in the form of sound.

In an embodiment, in a case where the remark content includes a visual element, the output configuration information on the remark content includes a display position of the visual element in the playing picture of the video segment. The display position may be indicated as coordinates in a coordinate axis of the playing picture of the video segment, or may be indicated as distances from two adjacent sides of the playing picture of the video segment.

The terminal 102b plays the video segment, and displays the visual element according to a display position of the visual element included in the output configuration information on the remark content in the playing picture of the video segment. The terminal 102b controls a display time period of the visual element included in the remark content or a playing time period of audio data included in the remark content based on an output time period for the remark content included in the output configuration information on the remark content.

In the embodiment, an output mode of the remark content may be controlled according to the output configuration information on the remark content, such that the remark content is outputted in multiple forms. The remark content may be combined with the video segment content deeply by controlling the display position of the remark content, and the information can be transmitted more effectively.

In an embodiment, the output configuration information on the remark content includes an output time period for the remark content. The video playing method further includes: beginning to time to obtain a time period when the remark content is displayed or played in the form of sound, and stopping displaying the remark content or playing the remark content in the form of sound when the time period reaches the output time period for the remark content.

In the embodiment, the output configuration information on the remark content may further include an output time period for the remark content. The output time period for the remark content defines a time period during which the remark content is displayed in the playing picture or played in the form of sound. In a case where the remark content includes a visual element, the visual element is displayed in the playing picture for the output time period for the remark content. In a case where the remark content includes audio data, the audio data is played for the output time period for the remark content. In this way, display time periods of different remark content are coordinated, thereby avoiding influencing a display effect or a playing effect of the different remark content due to display overlap of the different remark content.

In an embodiment, the remark content includes at least one of the visual element and the audio data. The visual element includes at least one of a graphic marker, a text and an icon. The visual element indicates an element which may be observed by human eyes, the graphic marker is a marker which is made in the playing picture of the video data by graphics. The icon includes a static icon, such as a static expression icon, and a dynamic icon, such as an expression animation icon.

In an embodiment, in the case where the remark content includes the visual element, the output configuration information on the remark content includes a display position of the visual element in the playing picture of the video segment. The display position may be indicated as coordinates in a coordinate axis of the playing picture of the video segment, or may be indicated as distances from two adjacent sides of the playing picture of the video segment.

Figure 17:
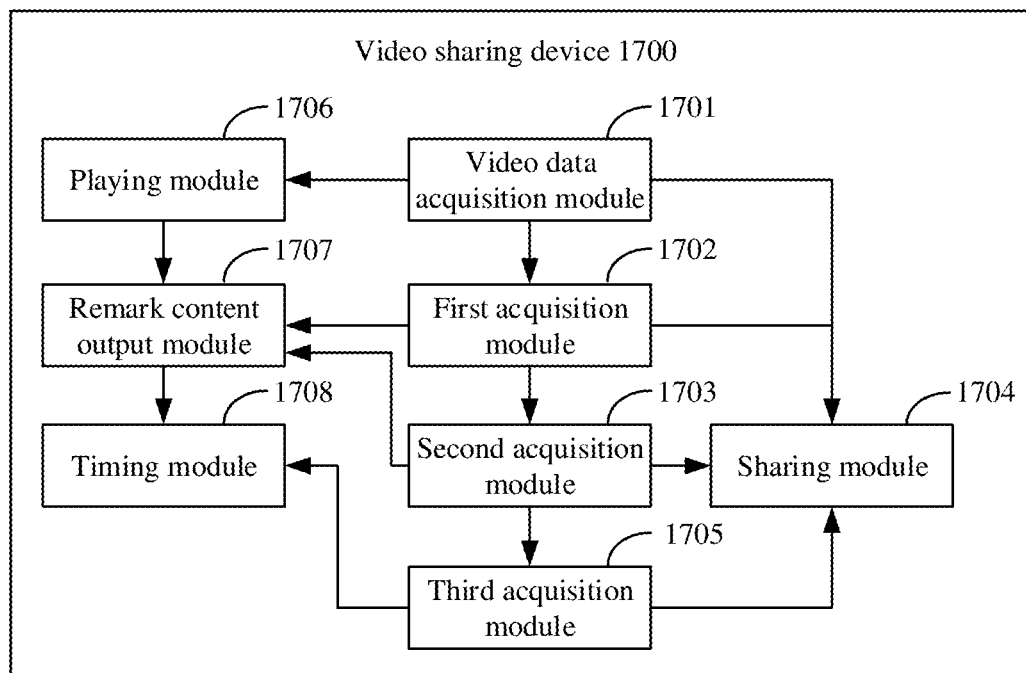
FIG. 17 is a schematic structural diagram of a video sharing device according to an embodiment of the present disclosure.

As shown in FIG. 17, a video sharing device 1700 is provided in an embodiment. The video sharing device includes function modules configured to realize the video sharing method described in the above embodiments. The device includes: a video data acquisition module 1701, a first acquisition module 1702, a second acquisition module 1703 and a sharing module 1704.

The video data acquisition module 1701 is configured to acquire a video segment.

The first acquisition module 1702 is configured to acquire a remark trigger position corresponding to play progress of the video segment.

The second acquisition module 1703 is configured to acquire remark content corresponding to the remark trigger position.

The sharing module 1704 is configured to share the video segment, the remark trigger position and the remark content with a terminal of a network social contact by a social application, so that the remark content is displayed in a playing picture of the video segment or is played in a form of sound when the terminal plays the video segment to the remark trigger position.

In an embodiment, the first acquisition module 1702 is further configured to display a play time axis corresponding to play progress of the video segment, detect an action point acted on the play time axis, and acquire the remark trigger position based on a position of the action point on the play time axis.

In an embodiment, the video sharing device 1700 further includes a third acquisition module 1705 configured to acquire output configuration information on remark content corresponding to the remark trigger position.

The sharing module 1704 is further configured to share the video segment, the remark trigger position, the remark content and the output configuration information on the remark content with a terminal of a network social contact by the social application, so that the remark content is displayed in the playing picture of the video segment or is played in the form of sound according to the output configuration information on the remark content, when the terminal plays the video segment to the remark trigger position.

In an embodiment, the remark content includes at least one of a visual element and audio data. In the case where the remark content includes the visual element, the output configuration information on the remark content includes a display position of the visual element in the playing picture of the video segment. The visual element includes at least one of a graphic marker, a text and an icon.

In an embodiment, the video sharing device 1700 further includes a playing module 1706, a remark content output module 1707 and a timing module 1708.

The playing module 1706 is configured to play the video segment in a content sharing page of the social application.

The remark content output module 1707 is configured to display the remark content or play the remark content in the form of sound according to the output configuration information on the remark content, when play progress of the video segment reaches the remark trigger position.

The timing module 1708 is configured to begin to time to obtain a time period when the remark content is displayed or played in the form of sound; and stop displaying the remark content or playing the remark content in the form of sound, when the time period reaches an output time period for the remark content included in the output configuration information on the remark content.

With the video sharing device 1700 described above, the video segment is acquired and the remark trigger position and the remark content corresponding to the video segment are acquired. Thus, in a case where the video segment, the remark trigger position and the remark content are shared with the terminal of the network social contact, the terminal may play the remark content when play progress of the video segment reaches the remark trigger position. In this way, the user may transmit the information attached to the video by means of remark, the remark trigger position is accurately combined with the play progress of the video, and further the remark trigger position is combined with the specific content of the video, so that the information can be transferred more effectively.

Figure 18:
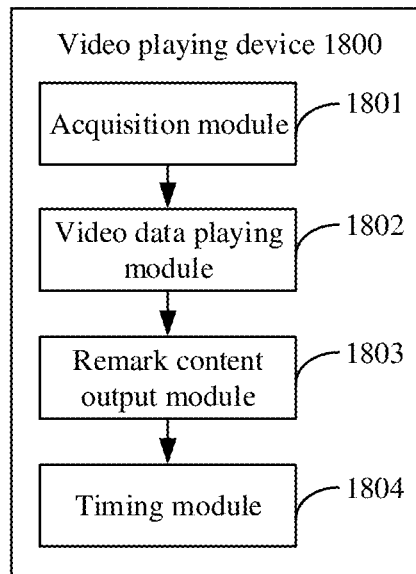
FIG. 18 is a schematic structural diagram of a video playing device according to an embodiment of the present disclosure.

As shown in FIG. 18, a video playing device 1800 is provided in an embodiment, which includes function modules configured to realize the video playing method in the embodiments described above. The video playing device 1800 includes an acquisition module 1801, a video data playing module 1802 and a remark content output module 1803.

The acquisition module 1801 is configured to acquire a video segment, a remark trigger position and a remark content corresponding to the video segment, shared by a network social contact through a social application.

The video data playing module 1802 is configured to play the video segment in a content sharing page of the social application.

The remark content output module 1803 is configured to display the remark content in a playing picture of the video segment or play the remark content in a form of sound, when play progress of the video segment reaches the remark trigger position.

In an embodiment, the acquisition module 1801 is further configured to acquire the video segment, the remark trigger position, the remark content and output configuration information on the remark content corresponding to the video segment, shared by the network social contact through the social application.

The remark content output module 1803 is further configured to display the remark content in the playing picture of the video segment or play the remark content in the form of sound according to the output configuration information on the remark content.

In an embodiment, the output configuration information on the remark content includes an output time period for the remark content. The video playing device 1800 further includes a timing module 1804 configured to begin to time to obtain a time period when the remark content is displayed or played in the form of sound; and stop displaying the remark content or playing the remark content in the form of sound, when the time period reaches the output time period for the remark content.

In an embodiment, the remark content includes at least one of a visual element and audio data. In a case where the remark content includes the visual element, the output configuration information on the remark content includes a display position of the visual element in the playing picture of the video segment. The visual element includes at least one of a graphic marker, a text and an icon.

With the above video playing device 1800, the network social contact shares the video segment, the remark trigger position and the remark content corresponding to the video segment through the social application. In a case where the video segment is played in the content sharing page of the social application, the remark content can be played when the play progress of the video segment reaches the remark trigger position. In this way, the network social contact can transmit information attached to the video by means of remark, the remark trigger position is accurately combined with the playing progress of the video, and further the remark trigger position is combined with the specific content of the video, so that the information can be transferred more effectively.

Figure 19:
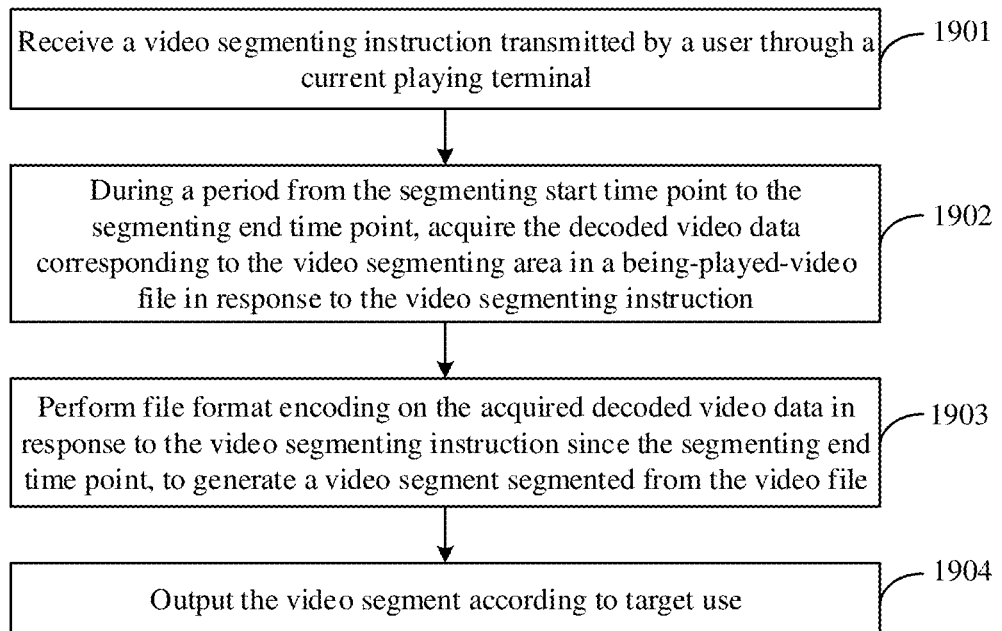
FIG. 19 is a schematic flowchart of a video segment acquisition method according to an embodiment of the present disclosure.

A video segment acquisition method is further provided according to an embodiment of the present disclosure, which may be applied to the terminal 102 in FIG. 1. Referring to FIG. 19, the method may include blocks 1901 to 1904 in the following.

In block 1901, a video segmenting instruction transmitted by a user through a current playing terminal is received.

The video segmenting instruction includes: a segmenting start time point, a segmenting end time point, a video segmenting area delimited in a play interface of the current playing terminal and a target use selected by the user.

In the embodiment of the present disclosure, in a case where the user operates the terminal to play the video, the user may operate a video segmenting button on the terminal when seeing an interesting video, so as to trigger the terminal to perform segmenting to obtain the video segment. For example, the video segmenting button is displayed on a touch screen of the terminal. In a case where the user needs to segment the video, the user clicks the video segmenting button on the touch screen, and the user transmits a video segmenting instruction to the terminal. The video segmenting instruction includes a segmenting start time point needed by the user. In a case where the user does not need to segment the video continuously, the user may click the video segmenting button on the touch screen again, and the user may transmit a video segmenting instruction to the terminal, and the video segmenting instruction includes a segmenting end time point needed by the user. Alternatively, in the embodiment of the present disclosure, the user may directly determine a time period of a video to be generated by segmenting, and the user may transmit a video segmenting instruction to the terminal, the video segmenting instruction includes an segmenting start time point and an segmenting end time point. The terminal may determine a time point to start segmenting a video and a time period of the video to be generated by segmenting. A time period of the video to be generated by segmenting may be determined according to the segmenting start time point and the segmenting end time point.

In the embodiment of the present disclosure, in a case where the user needs to segment a part of picture area of a play interface of a current playing terminal, rather than a video picture of the whole play interface, a user equipment may delimit a video segmenting area in the play interface of the current playing terminal, and no segmenting is performed on the picture outside the video segmenting area. The user equipment may include the video segmenting area delimited in the play interface in the video segmenting instruction. In addition, the user may select a target use through the video segmenting instruction, to instruct the terminal to output the segmented video segment in accordance with the specific target use after segmenting the video segment. For example, the user archives the segmented video segment, or shares the video segment with a QQ space or WeChat after archiving. The target use indicates a specific use of the video segment to be outputted by the user, and the video segment obtained by video segmenting in the present disclosure can meet the user's requirement of the target use.

In some embodiments of the present disclosure, in addition to including the segmenting start time point, the segmenting end time point, the video segmenting area delimited by the user and the target use selected by the user, the video segmenting instruction transmitted to the terminal by the user may further include other information for instructing the terminal by the user. For example, the user may instruct the terminal to output a video segment meeting a video parameter requirement. That is, a corresponding video segment may be outputted by outputting the segmented video segment according to the video parameter required by the user in the present disclosure, so as to meet more requirements of the user for the segmented video.

In some embodiments of the present disclosure, the video segmenting instruction may further include a target file format selected by the user, i.e., the user may instruct the terminal to output a video segment with the target file format as the video parameter. The file format is a format of the video file itself, such as MP4 and mkv. The target file format indicates a specific file format to be outputted by the user, and the video segment obtained by video segmenting in the present disclosure can meet the requirement of the user for the target file format described above.

In some embodiments of the present disclosure, the video segmenting instruction may include a target resolution selected by the user, i.e., the user may instruct the terminal to output a video segment with the target resolution as the video parameter. The resolution is used to define an amount of displayed information of the video file, and generally the width and the height are set as multiples of 16, such as 16×n (n=1, 2, 3 . . . ), such as 176×144, 352×288. The target resolution indicates a specific resolution to be outputted by the user, and the video segment obtained by video segmenting in the present disclosure can meet the requirement of the user for the target resolution described above.

In some embodiments of the present disclosure, the video segmenting instruction may further include a target video format selected by the user, i.e., the user may instruct the terminal to output a video segment having the target video format as the video parameter. The video format is an encoding format of a video content of the video file, such as H264. The target video format indicates a specific video format to be outputted by the user, and the video segment obtained by video segmenting in the present disclosure can meet the requirement of the user for the target video format described above.

In some embodiments of the present disclosure, the video segmenting instruction may further include a target video quality selected by the user, i.e., the user may instruct the terminal to output a video segment having the target video quality as the video parameter. The video quality indicates a video transmission level requirement of the video file, which may characterize a complexity of the video format. For example, the video quality may be classified into three levels or five levels, the user may select a level III as the required target video quality. The target video quality indicates a specific video quality level to be outputted by the user, and the video segment obtained by video segmenting in the present disclosure can meet the requirement of the user for the target video quality described above. It should be noted that, the video quality in the present disclosure may include other parameters of the video. For example, the video quality may be used to represent the number of frames between key frames in a group of picture (gop) of the video; the video quality may be used to represent a quantization parameter (qp) of the video which may determine an encoding compression rate of a quantizer and image accuracy; and the video quality may be further used to represent a configuration of the video, for example, including main setting indexes such as baseline, main and high.

In some embodiments of the present disclosure, the video segmenting instruction may further include a target video frame rate selected by the user, i.e. the user may instruct the terminal to output a video segment having the target video frame rate as the video parameter. The video frame rate indicates a video play rate of the video file and represents the number of frames of pictures played per second. For example, the video frame rate may be 30 fps, and the user may select a target video frame rate of 20 fps. The target video frame rate indicates a specific video frame rate to be outputted by the user, and the video segment obtained by video segmenting in the present disclosure can meet the requirement of the user for the target video frame rate described above.

In some embodiments of the present disclosure, the video segmenting instruction may further include a target use selected by the user, i.e., the user may instruct the terminal to output a video segment for specific use. The target use indicates an output manner of the segmented video file. For example, the file may be archived or may be shared after being archived. The target use indicates the specific use of the video segment to be outputted by the user, and the video segment obtained by video segmenting in the present disclosure can meet the requirement of the user for the target use described above.

It should be noted that, the various video parameters included in the video segmenting instruction received by the terminal in the present disclosure are described in detail above. It should be understood that the video segmenting instruction in the present disclosure may further include one or more of the video parameters described above, and the user may select the video parameter(s) in accordance with the application scenarios.

In block 1902, during a period from the segmenting start time point to the segmenting end time point, decoded video data corresponding to a video segmenting area in a being-played-video file is acquired in response to the video segmenting instruction.

In the embodiment of the present disclosure, when the terminal receives the video segmenting instruction including the segmenting start time point, the terminal monitors a being-played-video file in a play screen of the terminal to obtain a progress of the play time. When the play time reaches the segmenting start time point, the play time displayed currently is the segmenting start time point; since the segmenting start time point, the terminal acquires the decoded video data corresponding to the video segmenting area in the being-played-video file in a real-time manner. Further, in the present disclosure, the terminal needs to continuously acquire the decoded video data corresponding to the video segmenting area in the being-played-video file since the segmenting start time point, until the video segmenting instruction including the segmenting end time point is received.

A process of video playing includes: decoding the video file into original data and displaying the original data. It is marked at the segmenting start time point, and a being-played-video file is acquired. Because the video file has been decoded into decoded video data by a software decoder or a hardware decoder, the corresponding decoded video data may be obtained from the being-played-video file according to a correspondence of the video file before and after decoding. The decoded video data generally has an original data format, including three components: Y (luminance), U (Chrominance), V (Chrominance), and is generally applied to a field of video compression. The decoded video data generally used may be YUV420. For example, a time axis of the play time displays that a being-played-video file is at 4 min 20 sec. In a case where an segmenting start time point included in a video segmenting instruction received by the terminal is 4 min 22 sec, the decoded video data corresponding to the being-played-video file at this time instant are acquired when the time axis of the current play time reaches 4 min 22 s; and since 4 min 22 sec, the terminal needs to continuously acquire the decoded video data corresponding to a video segmenting area in the being-played-video file.

In the embodiment of the present disclosure, when the terminal receives the video segmenting instruction including the segmenting start time point, the terminal starts to acquire the decoded video data since the segmenting start time point. The terminal needs to continuously acquire the decoded video data until the play time reaches the segmenting end time point. After the terminal receives the video segmenting instruction including the segmenting end time point, the terminal monitors the time axis of the play time. When the time axis reaches the segmenting end time point, the terminal does not acquire the decoded video data corresponding to the video segmenting area in the being-played-video file. It should be understood that the decoded video data acquired by the terminal has a same playing order as the video file in a playing terminal.

In some embodiments of the present disclosure, the process of acquiring the decoded video data corresponding to the video segmenting area in the being-played-video file in response to the video segmenting instruction in block 1902 may include blocks A1 to A3 in the following.

In block A1, an offset position between the video segmenting area and a play interface of a current playing terminal is calculated.

In block A2, a coordinate mapping relationship between the video segmenting area and a video image in the being-played-video file is determined based on the calculated offset position.

In block A3, decoded video data corresponding to the video segmenting area is read from a frame buffer of the current playing terminal based on the coordinate mapping relationship.

Figure 20:
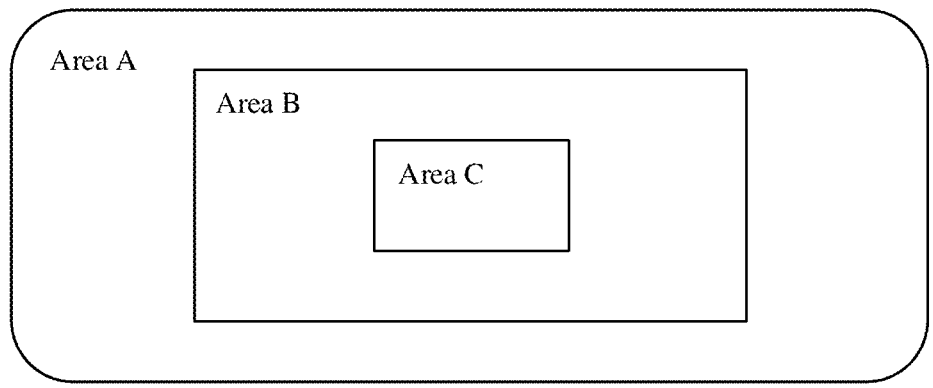
FIG. 20 is a schematic diagram of an acquisition manner of a video segmenting area according to an embodiment of the present disclosure.

A video segmenting box may be provided on a display screen of the current playing terminal. The user may drag the video segmenting box and adjust a size, a length, a width and a height of the video segmenting box by scaling. The terminal acquires the video segmenting area delimited in the play interface by the user according to an adjustment condition of the video segmenting box performed by the user, and thus the terminal may determine a part or all of the video picture to be used for segmenting by the user in the play interface. Reference is made to FIG. 20 which is a schematic diagram of an acquisition manner of the video segmenting area according to an embodiment of the present disclosure. In FIG. 20, an area A is a full screen area of the terminal, both an area B and an area C are video playing areas, the area B is the play interface, and the area C is the video segmenting area delimited by the user. Practically, a position and a size of the area C may be adjusted by dragging the video segmenting box by the user.

After the video segmenting area delimited by the user is determined, block A1 is performed, i.e., the terminal calculates the offset position between the video segmenting area and the play interface of the current playing terminal. That is, the play interface of the terminal is a rectangular box, the video segmenting area is a rectangular box, and offset positions of four corners of the video segmenting area relative to four corners of the play interface of the current playing terminal are to be calculated, thereby determining the offset position between the video segmenting area and the play interface of the current playing terminal. As shown in FIG. 20, in a case where the video file is to be played on the display screen, the video file may be played on the full screen, as shown in the area A of FIG. 20, or the video file may also be played on a part of the screen, as shown in the area B of FIG. 20. The video file may be played on any area between the area B and the area A. For any area, the user may delimit a square area in the video playing area as the video segmenting area to be used for segmenting. Offset positions of the delimited area relative to the four corners of the video playing area may be calculated according to a pixel position relationship.

After the offset position of the video segmenting area relative to the video play interface is acquired, block A2 is performed, i.e., based on the calculated offset position, the coordinate mapping relationship between the video segmenting area and the video image of the being-played-video file is determined. Although the offset position of the video segmenting area relative to the video play interface is calculated in block A1, a scaling relationship exists between the video play interface and an original video image. The video play interface may be the same as the original video image, i.e., a one to one ratio. The user may enlarge or shrink the original video image when operating the terminal. If it is to be displayed in the current video play interface, thus, the calculated offset position of the video segmenting area relative to the video play interface is to be remapped to obtain the coordinate mapping relationship between the video segmenting area and the video image of the being-played-video file. For example, as shown in FIG. 20, for coordinate mapping of the original video image, it is not determined to play in the area B or the area C, that is, the size of the video playing area may be not the same as the size of the original video image, therefore the coordinate mapping relationship of the offset position in the original video image is to be calculated after the offset position is calculated.

In some embodiments of the present disclosure, the decoded video data corresponding to the video segmenting area is read from the frame buffer of the current playing terminal based on the coordinate mapping relationship in block A3. When the current playing terminal is playing the video file, the video file is decoded into decoded video data through a software decoder or a hardware decoder, the terminal reads the decoded video data from the frame buffer, and the terminal outputs the read decoded video data to the display screen and displays the video data in the play interface. In the present disclosure, by means of the decoded video data stored in the frame buffer, the decoded video data corresponding to the being-played-video file at play time instants may be acquired in a real-time manner since the segmenting start time point. After the decoded video data corresponding to the being-played-video file is acquired, proportional conversion is performed based on the coordinate mapping relationship, the decoded video data corresponding to the video segmenting area is acquired, and decoded video data not corresponding to the video segmenting area in the play interface is beyond a range of the acquired decoded video data.

It should be noted that, in some embodiments of the present disclosure, the terminal may acquire the decoded video data corresponding to the video segmenting area in the being-played-video file by other ways. For example, a source file corresponding to the being-played-video file is acquired firstly, the source file is re-decoded to generate decoded video data; proportional conversion is performed based on the coordinate mapping relationship, the decoded video data corresponding to the video segmenting area is acquired. In this way, the decoded video data may also be acquired.

In some embodiments of the present disclosure, if the video segmenting instruction further includes a target resolution selected by the user, the video segment segmenting method according to the present disclosure may further include blocks B1 to B2, before block 1903, that is, file format encoding is performed on the acquired decoded video data in response to the video segmenting instruction since the segmenting end time point.

In block B1, it is determined whether an original resolution of a video image in the video file corresponding to the acquired decoded video data is the same as the target resolution.

In block B2, if the original resolution is different from the target resolution, the resolution of the video image in the video file corresponding to the acquired decoded video data is converted to obtain the acquired decoded video data with the target resolution.

After the decoded video data is acquired in block 1902, it is indicated that the user needs to specify a resolution of the segmented video segment if the video segmenting instruction received by the terminal further includes the target resolution. The terminal may acquire an original resolution of the video image from file header information of the video file firstly. The original resolution of the video image in the video file is a resolution displayed when the video file to be played in the display screen of the terminal is played. If the user needs to adjust the original resolution of the video image in the video file, a resolution adjustment menu may be displayed on the display screen of the terminal. The user specifies the resolution of the segmented video segment (i.e. the target resolution included in the video segmenting instruction). After the original resolution of the video image in the video file is obtained, it is determined whether the target resolution is same as the original resolution. If the target resolution is the same as the original resolution, it is not necessary to convert the resolution. If the target resolution is different from the original resolution, the resolution is to be converted. Specifically, a third party library (such as ffmpeg) may be invoked to realize the resolution conversion, to obtain the acquired decoded video data including the target resolution. In subsequent block 1903, file format encoding is performed on the acquired decoded video data with the target resolution described here, i.e., the acquired decoded video data described in block 1903 is the acquired decoded video data with the target resolution.

In some embodiments of the present disclosure, if the video segmenting instruction further includes a target resolution selected by the user, the video segment segmenting method according to the present disclosure may further include blocks C1 to C3 in the above application scenario where blocks A1 to A3 are performed and before block 1903, i.e., performing file format encoding on acquired decoded video data in response to the video segmenting instruction since the segmenting end time point.

In block C1, a resolution mapping value is calculated by using the coordinate mapping relationship and the original resolution of the video image in the video file corresponding to the acquired decoded video data.

In block C2, it is determined whether the resolution mapping value is the same as the target resolution.

In block C3, if the resolution mapping value is different from the target resolution, the video image in the video file corresponding to the acquired decoded video data is scaled, to obtain the scaled acquired decoded video data.

After the decoded video data is acquired in block 1902, it is indicated that the user needs to specify the resolution of the segmented video segment if the video segmenting instruction received by the terminal further includes the target resolution. The terminal may acquire the original resolution of the video image from the file header information of the video file firstly. The original resolution of the video image in the video file is a resolution displayed when the video file to be played in the display screen of the terminal is played. If the user needs to adjust the original resolution of the video image in the video file, a resolution adjustment menu may be displayed on the display screen of the terminal. The user specifies the resolution of the segmented video segment (i.e., the target resolution included in the video segmenting instruction). After obtaining the original resolution of the video image in the video file, the user adjusts the original video image in conjunction with the application scenario where blocks A1 to A3 are performed. A coordinate mapping relationship may be generated according to blocks A1 to A3 described above, i.e., the coordinate mapping relationship between the video segmenting area and the video image in the being-played-video file, and a resolution mapping value is calculated based on the coordinate mapping relationship in combination with the original resolution. It is determined whether the target resolution is the same as the resolution mapping value. If the target resolution is the same as the resolution mapping value, it is not necessary to scale the video image in the video file. If the target resolution is different from the resolution mapping value, the video image in the video file is to be scaled. Specifically, a third party library (such as ffmpeg) may be invoked to realize the scaling processing of the video image, to obtain the scaled acquired decoded video data. In subsequent block 1903, file format encoding is performed on the scaled acquired decoded video data described here, i.e., the acquired decoded video data described in block 1903 is the scaled acquired decoded video data.

In some embodiments of the present disclosure, if the video segmenting instruction further includes a target video format selected by the user, the video segment segmenting method according to the present disclosure may further include blocks D1 to D2 before block 1903, i.e., performing file format encoding on the acquired decoded video data in response to the video segmenting instruction since the segmenting end time point.

In block D1, it is determined whether an original video format of the video file corresponding to the acquired decoded video data is the same as the target video format.

In block D2, if the original video format is different from the target video format, the video format of the video file corresponding to the acquired decoded video data is converted to obtain acquired decoded video data having the target video format.

After the decoded video data is acquired in block 1902, it is indicated that the user needs to specify the video format of the segmented video segment if the video segmenting instruction received by the terminal further includes the target video format. The terminal may acquire the original video format of the video image from the file header information of the video file firstly. The original video format of the video image in the video file is a video format when the video file to be played in the display screen of the terminal is played. If the user needs to adjust the original video format of the video image in the video file, a video format adjustment menu may be displayed on the display screen of the terminal. The user specifies the video format of the segmented video segment (i.e., the target video format included in the video segmenting instruction). After the original video format of the video image in the video file is obtained, it is determined whether the target video format is the same as the original video format. If the target video format is the same as the original video format, it is not necessary to convert the video format. If the target video format is different from the original video format, the video format is to be converted. Specifically, a third party library (such as ffmpeg) may be invoked to realize the conversion of the video format, to obtain the acquired decoded video data having the target video format. In subsequent block 1903, file format encoding is performed on the acquired decoded video data having the target video format described here, i.e., the acquired decoded video data described in block 1903 is the acquired decoded video data having the target video format.

In some embodiments of present disclosure, if the video segmenting instruction further includes a target video quality selected by the user, the video segment segmenting method according to the present disclosure may further include blocks E1 to E2 before block 1903, i.e., performing file format encoding on the acquired decoded video data in response to the video segmenting instruction since the segmenting end time point.

In block E1, it is determined whether an original video quality of the video file corresponding to the acquired decoded video data is the same as the target video quality.

In block E2, if the original video quality is different from the target video quality, the video quality of the video file corresponding to the acquired decoded video data is adjusted to obtain the acquired decoded video data having the target video quality.

After the decoded video data is acquired in block 1902, it is indicated that the user needs to specify the video quality of the segmented video segment if the video segmenting instruction received by the terminal further includes the target video quality. The terminal may acquire the original video quality of the video image from the file header information of the video file firstly. The original video quality of the video image in the video file is a video quality displayed when the video file to be played in the display screen of the terminal is played. If the user needs to adjust the original video quality of the video image in the video file, a video quality adjustment menu may be displayed on the display screen of the terminal. The user specifies the video quality of the segmented video segment (i.e., the target video quality included in the video segmenting instruction). After the original video quality of the video image in the video file is obtained, it is determined whether the target video quality is the same as the original video quality. If the target video quality is the same as the original video quality, it is not necessary to adjust the video quality may be necessary. For example, if the video quality indicates the number of frames between key frames in a group of picture of the video, the video quality indicates a quantization coefficient of the video and configuration of the video. If the target video quality is the same as the original video quality, the above video parameters are the same. If the target video quality is different from the original video quality, the video quality is to be adjusted. Specifically, a third party library (such as ffmpeg) may be invoked to realize the conversion of the video quality, to obtain the acquired decoded video data having the target video quality. In subsequent block 1903, file format encoding is performed on the acquired decoded video data having the target video quality described here, i.e., the acquired decoded video data described in block 1903 is the acquired decoded video data having the target video quality.

In some embodiments of present disclosure, if the video segmenting instruction further includes a target video frame rate selected by the user, the video segment segmenting method according to the present disclosure may further include blocks F1 to F2 before block 1903, i.e., performing file format encoding on the acquired decoded video data in response to the video segmenting instruction since the segmenting end time point.

In block F1, it is determined whether an original video frame rate of the video file corresponding to the acquired decoded video data is the same as the target video frame rate.

In block F2, if the original video frame rate is different from the target video frame rate, the video frame rate of the video file corresponding to the acquired decoded video data is converted to obtain acquired decoded video data having the target video frame rate.

After the decoded video data is acquired in block 1902, it is indicated that the user needs to specify the video frame rate of the segmented video segment if the video segmenting instruction received by the terminal further includes the target video frame rate. The terminal may acquire the original video frame rate of the video image from the file header information of the video file firstly. The original video frame rate of the video image in the video file is a video frame rate displayed when the video file to be played in the display screen of the terminal is played. If the user needs to adjust the original video frame rate of the video image in the video file, a video frame rate adjustment menu may be displayed on the display screen of the terminal. The user specifies the video frame rate of the segmented video segment (i.e., the target video frame rate included in the video segmenting instruction). After the original video frame rate of the video image in the video file is obtained, it is determined whether the target video frame rate is the same as the original video frame rate. If the target video frame rate is the same as the original video frame rate, it is not necessary to convert the video frame rate. If the target video frame rate is different from the original video frame rate, the video frame rate is to be converted. Specifically, a third party library (such as ffmpeg) may be invoked to realize the conversion of the video frame rate, to obtain the acquired decoded video data having the target video frame rate. In subsequent block 1903, file format encoding is performed on the acquired decoded video data having the target video frame rate descried here, i.e., the acquired decoded video data described in block 1903 is the acquired decoded video data having the target video frame rate.

In block 1903, file format encoding is performed on the acquired decoded video data in response to the video segmenting instruction since the segmenting end time point, to obtain a video segment segmented from the video file.

In the embodiment of the present disclosure, multiple pieces of decoded video data is acquired from the segmenting start time point to the segmenting end time point in block 1902. When the segmenting end time point is reached, the terminal stops acquiring the decoded video data. In this way, since the segmenting end time point, the terminal has acquired the decoded video data corresponding to the video file to be generated by segmenting. Subsequently, the acquired decoded video data is packaged, such that the decoded video data acquired in block 1902 is packaged into a file, i.e., file format encoding may be performed on the acquired decoded video data, so as to obtain a video segment to be generated by segmenting by the user. The generated video segment is obtained from the video file played in the play interface of the terminal.

In some embodiments of the present disclosure, if the video segmenting instruction further includes a target file format selected by the user, the process of performing, since the segmenting end time point, file format encoding on the acquired decoded video data in response to the video segmenting instruction in block 1903 may include following operation.

The acquired decoded video data is encoded into a video segment meeting the target file format by using a file synthesizer. File header information is included in the video segment, and the file header information includes attribute information on the video segment.

After the decoded video data is acquired in block 1902, it is indicated that the user needs to specify the file format of the segmented video segment if the video segmenting instruction received by the terminal further includes the target file format. After the decoded video data is acquired by performing block 1902, the acquired decoded video data may be encoded into a video segment meeting the target file format by using the file synthesizer. Specifically, a third party library (such as ffmpeg) may be invoked to realize the conversion of the file format to obtain the video segment meeting the target file format. The file header information is included in the generated video segment when the file synthesizer is used. The file header information includes basic feature information of the video segment. For example, the file header information includes the attribute information of the video segment.

In block 1904, the video segment is outputted according to target use.

In the embodiment of the present disclosure, the video segmenting instruction further includes target use selected by the user. After block 1903, i.e., performing, since the segmenting end time point, file format encoding on the acquired decoded video data in response to the video segmenting instruction, to generate the video segment segmented from the video file, the segmented video segment is to be outputted according to selection of the user, thereby solving the requirement of the user for video segmenting by the terminal.

That is, in present disclosure, after the terminal segments the video segment from the video file, the video segment may be outputted for specific target use according to the requirement of the user. For example, the user archives the segmented video segment, or shares the segmented video segment to a personal blog or a microblog after archiving. The target use indicates the specific use of the video segment to be outputted by the user, and the video segment obtained by video segmenting can meet the requirement of the user for the target use in the present disclosure.

It can be known from the above description of the embodiment of the present disclosure that, the video segmenting instruction is received firstly. The video segmenting instruction includes: the segmenting start time point and the segmenting end time point. During a period from the segmenting start time point to the segmenting end time point, the decoded video data corresponding to the video segmenting area in the being-played-video file is acquired in response to the video segmenting instruction. File format encoding is performed on the acquired decoded video data in response to the video segmenting instruction since the segmenting end time point, to generate the video segment segmented from the video file. When the play interface of the terminal in the present disclosure starts to play the video file and the play time reaches the segmenting start time point, the decoded video data corresponding to the video segmenting area in the being-played-video file can be acquired. Before the segmenting end time point, the decoded video data corresponding to the video segmenting area in the being-played-video file is to be acquired continuously. Multiple pieces of decoded video data may be acquired in response to the video segmenting instruction. When the segmenting end time point arrives, file format encoding is performed on the acquired decoded video data in response to the video segmenting instruction, so as to generate the video segment segmented from the video file. In the present disclosure, the video segment to be generated by segmenting is obtained by acquiring the decoded video data corresponding to the being-played-video file and performing file format encoding on the decoded video data, instead of obtaining the video segment by capturing and combining multiple video images. In the present disclosure, even if a video segment with a large time span is to be generated by segmenting, the segmenting efficiency of the video segment is high as long as the user sets the inception start time point and the segmenting end time point.

In order to make solutions of the embodiments of the present disclosure being understood and implemented better, it is illustrated in detail according to corresponding application scenarios hereinafter.

Figure 21:
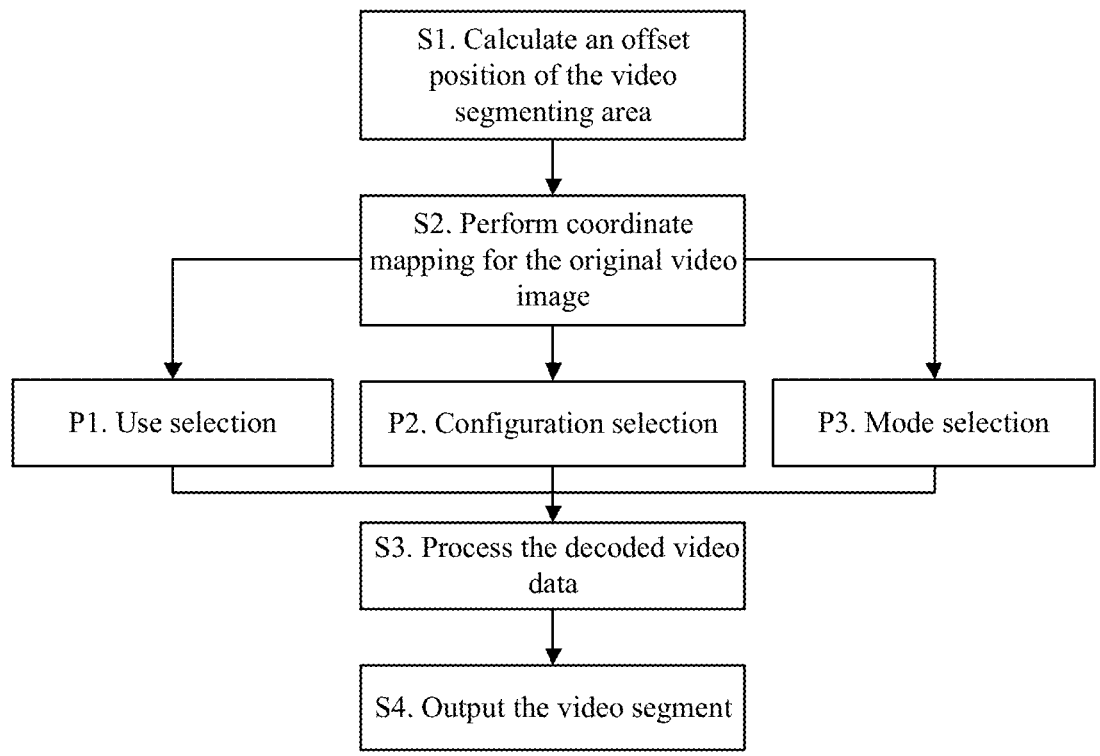
FIG. 21 is a schematic flowchart of a video segment acquisition method according to an embodiment of the present disclosure.

It is illustrated by assuming that the user watches a video through a browser. In a case where the user sees a favorite video picture, the user may choose to segment the whole video picture segment or a part of the video picture segment to produce a video segment without audio, and store the video segment locally or share the video segment with a friend. Reference is made to FIG. 21 which is a schematic flowchart showing segmenting of a video segment according to an embodiment of the present disclosure.

In block S1, an offset position of a video segmenting area is calculated.

In a case where a video file is played on a display screen of a terminal, the video file may be played on the full screen, as shown in the area A of FIG. 20, or the video file may be played in a part of the screen, as shown in the area B of FIG. 20. The video file may also be played in any area between the area B and the area A. For any area, the user may delimit a square area in a video playing area as the video segmenting area to be used for segmenting. Offset positions of the delimited area relative to four corners of the video playing area are to be calculated firstly.

In block S2, a coordinate mapping is performed for an original video image.

Because the area different from the area B and the area C is uncertain, i.e., a size of the video playing area may be not the same as a size of the original video image, the coordinate mapping relationship for the offset position in the original video image is calculated after the offset position is calculated.

After block S1 and block S2 are performed, it is selected from menus P1, P2, P3. The display screen of the terminal needs to provide a menu for the user to select. Specifically, the following menus are provided:

P1, use selection: determining whether the segmented video segment is archived only or shared after being archived;

P2, configuration selection: a resolution, a video format, a video quality, a file format, a video frame rate, a video segmenting time period (i.e., an segmenting start time point and an segmenting end time point); and P3, mode selection: determining whether a single video segment or multiple video segments are to be generated by segmenting.

In block S3, the decoded video data is processed.

In a case where the user performs block S1, i.e., delimiting an area for operation, the processing starts from a current time point by default. A process of video playing is a process of decoding the video file into original data and displaying the original data again. Generally, the original data has a form of YUV420. The video segment is synthesized from the original data, it is not necessary to re-decode a source file, thereby saving processor resources of the terminal more and saving an electric quantity of the terminal.

Figure 22:
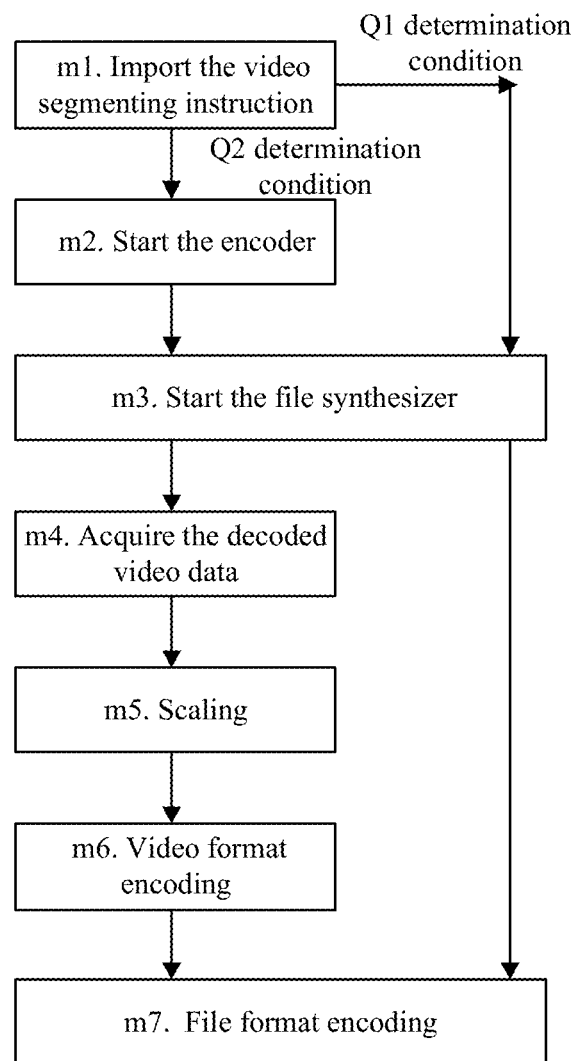
FIG. 22 is schematic flowchart of processing decoded video data according to an embodiment of the present disclosure.

Reference is made to FIG. 22, which is a schematic flowchart showing processing of the decoded video data according to an embodiment of the present disclosure. The process may include blocks m1 to m7 in the following.

In block m1, a target resolution, a target video format, a target video quality, a target file format, a target video frame rate and a length of a video to be generated by segmenting selected by the user are acquired from a video segmenting instruction. Depending on different configurations, a process after block m1 includes the following two different processes, such as Q1 and Q2 which are described respectively subsequently.

Q1, it is determined whether the following conditions are met: the target resolution is the same as an original resolution, the target video frame rate is the same as an original frame rate, the target video format is the same as an original video format (i.e., a target encoder and an original decoder adopt a same compression video protocol), and the target video quality is the same as an original video quality. In a case where these conditions are met, a Q1 decision process is performed. File format encoding is performed on the acquired decoded video data in response to the video segmenting instruction to generate a video segment segmented from the video file, and the process is equivalent to a copy mode. It is not necessary to decompress the video file during the Q1 process, and the decoded video data is only repackaged into a new file format.

Specifically, a flow under the Q1 process includes the following operations.

In block m3, according to the target file format, the file synthesizer is started to generate file header information. The file header information includes some basic features of the video segment, such as attribute and a video encoding format of the video segment.

In block m7, the file synthesizer is invoked to perform file format encoding on the encoded video data based on a rule, so as to obtain a video segment. The rule here indicates that if the target file format selected by the user is an mp4 format, the video segment finally obtained by encoding should be a video segment generated according to an organization mode of a video for the mp4 file.

Q2: any of the conditions in Q1 is not met. That is, at least one of the following conditions is met: the target resolution is different from the original resolution, the target video frame rate is different from the original frame rate, the target video format is different from the original video format (i.e., the target encoder and the original decoder adopt different compression video protocols), and the target video quality is different from the original video quality. In this case, a Q2 decision process is performed.

Specifically, a flow under the Q2 process includes the following operations.

In block m2, an encoder is started according to a format of a video to be encoded.

In block m3, according to a file format, the file synthesizer is started to generate file header information.

In block m4, decoded video data is acquired through a decoding procedure of a current playing process.

In block m5, it is determined whether to perform scaling based on the information obtained from block m1. For example, the user delimits a video segmenting area, the video segmenting area is compared with a current player range to obtain a ratio relationship. A size is calculated with the ratio relationship in conjunction with the original resolution. If the size differs from the target resolution, scaling is to be performed, so that a resolution of the outputted video segment meets the requirement. If the size is the same as the target resolution, it is not necessary to perform scaling.

In block m6, the encoder is invoked to perform video format encoding on the encoded video data according to the target video format.

In block m7, the file synthesizer is invoked to perform encoding on the encoded video data according to the target file format, to generate a video segment.

It should be noted that, in the present disclosure, the flow of processing the encoded video data synchronizes with the playing process of the video file. If multiple video segments are synthesized, the above process Q1 or Q2 is repeated.

In block S4, the video segment is outputted.

When the video segments are synthesized successfully, the user is promoted about the result. According to a selection mode for P1, if the segmented video segment is archived only, a third party application is invoked to open a video folder. If the segmented video segment is shared, the third party application is invoked to perform sharing, such as a microblog application.

It should be noted that, for the method embodiments, they are described as a combination of a series of actions for briefness of description. However, those skilled in the art should understand that the present disclosure is not limited by an order of the described actions, because some blocks may be performed in other orders or simultaneously according to the present disclosure. Secondly, those skilled in the art should also understand that the embodiments described in the specification are examples, and that one or more disclosed actions and modules involved may be not required.

In order to implement the above solutions of the embodiments of the present disclosure, a related device configured to implement the above solutions is provided hereinafter.

Referring to FIG. 23-a, a video segment acquisition device 2300 is provided according to an embodiment of the present disclosure, which may include: a receiving module 2301, a video data acquisition module 2302, a file encoding module 2303 and a video segment output module 2304.

The receiving module 2301 is configured to receive a video segmenting instruction transmitted by a user via a current playing terminal. The video segmenting instruction includes: a segmenting start time point and a segmenting end time point of a video to be generated by segmenting determined by the user, a video segmenting area delimited by the user in a play interface of a current playing terminal and target use selected by the user.

The video data acquisition module 2302 is configured to acquire, during a period from the segmenting start time point to the segmenting end time point, decoded video data corresponding to the video segmenting area in a being-played-video file in response to the video segmenting instruction.

The file encoding module 2303 is configured to perform file format encoding on the acquired decoded video data in response to the video segmenting instruction since the segmenting end time point, to generate a video segment segmented from the video file.

The video segment output module 2304 is configured to output the video segment according to the target use, after the file encoding module 2303 performs file format encoding on the acquired decoded video data in response to the video segmenting instruction since the segmenting end time point to generate the video segment segmented from the video file.

In some embodiments of the present disclosure, referring to FIG. 23-b, the video data acquisition module 2302 includes: a position calculation unit 23021, a mapping relationship determining unit 23022 and a video data reading unit 23023.

The position calculation unit 23021 is configured to calculate an offset position between the video segmenting area and the play interface of the current playing terminal.

The mapping relationship determining unit 23022 is configured to determine a coordinate mapping relationship between the video segmenting area and a video image in the being-played-video file based on the calculated offset position.

The video data reading unit 23023 is configured to read the decoded video data corresponding to the video segmenting area from a frame buffer of the current playing terminal based on the coordinate mapping relationship.

In some embodiments of the present disclosure, if the video segmenting instruction further includes the target file format selected by the user, the file encoding module 2303 is configured to encode the acquired decoded video data into a video segment with the target file format by using a file synthesizer. File header information is included in the video segment, and the file header information includes attribute information on the video segment.

In some embodiments of the present disclosure, referring to FIG. 23-c, if the video segmenting instruction further includes the target resolution selected by the user, the video segment acquisition device 2300 further includes a resolution coordination module 2305 configured to, before the file encoding module 2303 performs file format encoding on the acquired decoded video data in response to the video segmenting instruction since the segmenting end time point: determine whether an original resolution of the video image in the video file corresponding to the acquired decoded video data is the same as the target resolution; and convert a resolution of the video image in the video file corresponding to the acquired decoded video data to obtain the acquired decoded video data with the target resolution, if the original resolution is not the same as the target resolution.

In some embodiments of the present disclosure, if the video segmenting instruction further includes the target resolution selected by the user, the video segment acquisition device 2300 further includes a resolution coordination module 2305 configured to, before the file encoding module performs file format encoding on the acquired decoded video data in response to the video segmenting instruction since the segmenting end time point: calculate a resolution mapping value by using the coordinate mapping relationship and the original resolution of the video image in the video file corresponding to the acquired decoded video data; determine whether the resolution mapping value is the same as the target resolution; and scale the video image in the video file corresponding to the acquired decoded video data, to obtain the scaled acquired decoded video data, if the resolution mapping value is different from the target resolution.

In some embodiments of the present disclosure, referring to FIG. 23-d, if the video segmenting instruction further includes the target video format selected by the user, the video segment acquisition device 2300 further includes a video format coordination module 2306 configured to, before the file encoding module 2303 performs file format encoding on the acquired decoded video data in response to the video segmenting instruction since the segmenting end time point: determine whether an original video format of the video file corresponding to the acquired decoded video data is same as the target video format; and convert the video format of the video file corresponding to the acquired decoded video data to obtain the acquired decoded video data having the target video format, if the original video format is different from the target video format.

In some embodiments of the present disclosure, referring to FIG. 23-e, if the video segmenting instruction further includes the target video quality selected by the user, the video segment acquisition device 2300 further includes a video quality coordination module 2307 configured to, before the file encoding module 2303 performs file format encoding on the acquired decoded video data in response to the video segmenting instruction since the segmenting end time point: determine whether an original video quality of the video file corresponding to the acquired decoded video data is same as the target video quality; and adjust a video quality of the video file corresponding to the acquired decoded video data to obtain the acquired decoded video data having the target video quality, if the original video quality is different from the target video quality.

In some embodiments of the present disclosure, referring to FIG. 23-f, if the video segmenting instruction further includes the target video frame rate selected by the user, the video segment acquisition device 2300 further includes a video frame rate coordination module 2309 configured to, before the file encoding module performs file format encoding on the acquired decoded video data in response to the video segmenting instruction since the segmenting end time point: determine whether an original video frame rate of the video file corresponding to the acquired decoded video data is the same as the target video frame rate; and convert a video frame rate of the video file corresponding to the acquired decoded video data to obtain the acquired decoded video data having the target video frame rate, if the original video frame rate is different from the target video frame rate.

It can be known from the above description of the embodiments of the present disclosure that, the video segmenting instruction is received firstly in a case where the user transmits the video segmenting instruction through the current playing terminal. The video segmenting instruction may include a segmenting start time point, a segmenting end time point, the video segmenting area delimited by the user and the target use selected by the user. When the play interface of the terminal starts to play the video file and the play time reaches the segmenting start time point, the decoded video data corresponding to the video segmenting area in the being-played-video file can be obtained. Before the segmenting end time point is reached, the decoded video data corresponding to the video segmenting area in the being-played-video file is to be acquired continuously. Multiple pieces of decoded video data may be acquired in response to the video segmenting instruction. After the segmenting end time point is reached, file format encoding is performed on the acquired decoded video data in response to the video segmenting instruction, to generate the video segment segmented from the video file. The video segment may be outputted according to the target use selected by the user after the segmented video segment is generated. In the present disclosure, the video segment to be generated by segmenting is obtained by acquiring the decoded video data corresponding to the being-played-video file and performing file format encoding on the decoded video data, instead of obtaining the video segment by capturing and combining multiple video images. In the present disclosure, even if the video segment with a large time span is to be generated by segmenting, the segmenting efficiency of the video segment is high as long as the user sets the segmenting start time point and the segmenting end time point.

Figure 24:
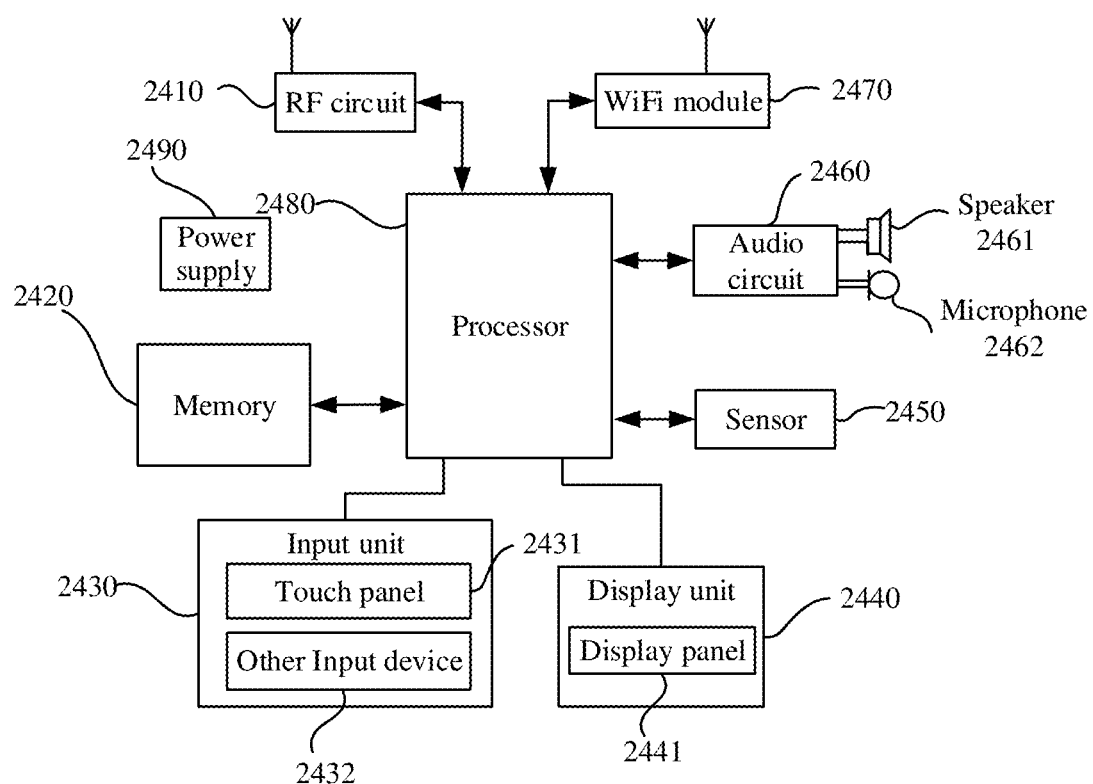
FIG. 24 is a schematic diagram showing a structure of a terminal to which the video sharing method is applied according to an embodiment of the present disclosure.

Another terminal is provided according to an embodiment of the present disclosure. As shown in FIG. 24, for facilitating illustration, only parts related to the embodiment of the present disclosure are shown; and for specific technical details not disclosed here, one may refer to the method embodiments of the present disclosure. The terminal may be any terminal device such as a mobile phone, a tablet computer, a Personal Digital Assistant (PDA), a Point of Sales (POS) and an on-board computer. It is illustrated by assuming that the terminal is a mobile phone hereinafter.

FIG. 24 is a partial structural block diagram of a mobile phone related to the terminal according to an embodiment of the present disclosure. Referring to FIG. 24, the mobile phone includes: a Radio Frequency (RF) circuit 2410, a memory 2420, an input unit 2430, a display unit 2440, a sensor 2450, an audio circuit 2460, a wireless fidelity (WiFi) module 2470, a processor 2480 and a power supply 2490 and so on. It should be understood by those skilled in the art that the mobile phone is not limited to have the structure shown in FIG. 24, the mobile phone may include more or less components than those shown in FIG. 24, or may include a combination of some components or different arrangement of the components.

The components of the mobile phone are described in detail in conjunction with FIG. 24 hereinafter.

The RF circuit 2410 may be configured to receive and transmit a signal during a process of transceiving information or calling. In particular, the RF circuit 2410 receives downlink information from a base station, and transmits the downlink information to the processor 2480 for processing. Further, the RF circuit 2410 transmits uplink data to the base station. Generally, the RF circuit 2410 includes but is not limited to an antenna, at least one amplifier, a transceiver, a coupler, a Low Noise Amplifier (LNA) and a duplexer, etc. The RF circuit 2410 may communicate with a network device and other devices through wireless communication. The above wireless communication may be performed by using any communication standard or protocol, including but not limited to Global System of Mobile communication (GSM), General Packet Radio Service (GPRS), Code Division Multiple Access (CDMA), Wideband Code Division Multiple Access (WCDMA), Long Term Evolution (LTE), e-mail and Short Messaging Service (SMS), etc.

The memory 2420 may be configured to store software programs and modules. The processor 2480 performs various types of function applications and data processing of the mobile phone by running the software programs and modules stored in the memory 2420. The memory 2420 may mainly include a program storage area and a data storage area. The program storage area may store an operating system and an application program required for at least one function (such as a sound playing function and an image playing function), etc. The data storage area may store data (such as audio data and a telephone book) created based on the use of the mobile phone, etc. In addition, the memory 2420 may include a high-speed random access memory, and may further include a non-volatile memory, such as at least one magnetic disk storage device and a flash memory device, or include other volatile solid state memory device.

The input unit 2430 may be configured to receive inputted digital or character information, and generate key signal input related to user settings and function control of the mobile phone. The input unit 2430 may include a touch panel 2431 and other input device 2432. The touch panel 2431, also referred to as a touch screen, may collect a touch operation (for example, an operation performed on the touch panel 2431 or in the vicinity of the touch panel 2431 by the user through any suitable object or accessory such as a finger or a stylus) performed thereon or in the vicinity thereof by the user, and drive a corresponding connection device according to a preset program. Optionally, the touch panel 2431 may include a touch detection device and a touch controller. The touch detection device detects a touch orientation of the user and a signal generated by the touch operation, and transmits the signal to the touch controller. The touch controller receives touch information from the touch detection device, converts the touch information into contact coordinates, transmits the contact coordinates to the processor 2480, and receives and executes a command transmitted from the processor 2480. The touch panel 2431 may be implemented as various types such as a resistance touch panel, a capacitive touch panel, an infrared touch panel and a surface acoustic wave touch panel. In addition to the touch panel 2431, the input unit 2430 may further include other input device 2432. The other input device 2432 may include but not limited to one or more of a physical keyboard, a function key (such as a volume control button and a switch button), a trackball, a mouse and an operation lever.

The display unit 2440 may be configured to display information inputted by the user or information provided to the user and various menus of the mobile phone. The display unit 2440 may include a display panel 2441. Optionally, the display panel 2441 may be configured by using a Liquid Crystal Display (LCD) and an Organic Light-Emitting Diode (OLED), etc. Further, the touch panel 2431 may cover the display panel 2441. In a case that the touch panel 2431 detects a touch operation performed thereon or in the vicinity thereof, the touch panel 2431 transmits the touch operation to the processor 2480 to determine a type of the touch event. The processor 2480 provides a corresponding visual output on the display panel 2441 based on the type of the touch event. Although the touch panel 2431 and the display panel 2441 function as two independent components to implement input and output functions of the mobile phone in FIG. 24, the touch panel 2431 and the display panel 2441 may be integrated to realize the input and output functions of the mobile phone in some embodiments.

The mobile phone may further include at least one sensor 2450 such as a light sensor, a motion sensor and other sensors. The light sensor may include an ambient light sensor and a proximity sensor. The ambient light sensor may adjust brightness of the display panel 2441 in accordance with brightness of the ambient light, and the proximity sensor may turn off the display panel 2441 and/or backlight when the mobile phone is moved close to the ear. As one type of the motion sensor, an accelerometer sensor may detect magnitudes of accelerations in all directions (usually in three axes), and may detect a magnitude and a direction of gravity when being static. The accelerometer sensor may be applied into an application for recognizing a posture of the mobile phone (such as vertical and horizontal screen switch, a related game, magnetometer posture calibration), and have functions related to vibration recognition (such as a pedometer and knocking), etc. Other sensors, such as a gyroscope, a barometer, a hygrometer, a thermometer and an infrared sensor, which may be configured for the mobile phone are not described in detail here.

The audio circuit 2460, a speaker 2461 and a microphone 2462 may provide an audio interface between the user and the mobile phone. The audio circuit 2460 may convert received audio data into an electrical signal, and transmit the electrical signal to the speaker 2461. The speaker 2461 converts the electrical signal into a sound signal for outputting. In another aspect, the microphone 2462 converts the collected sound signal into an electrical signal, the audio circuit 2460 receives the electrical signal and converts the electrical signal into audio data, and then the audio data is outputted to the processor 2480 for processing. The processed data is transmitted to for example another mobile phone through the RF circuit 2410, or the audio data is outputted to the memory 2420 for further processing.

The WiFi adopts short distance wireless transmission technology. The mobile phone may assist the user in transceiving e-mails, browsing a webpage and accessing a streaming media, etc. through the WiFi module 2470, thereby providing wireless broadband Internet access for the user. Although FIG. 24 shows the WiFi module 2470, it should be understood that the WiFi module 2470 is not a necessary component of the mobile phone and may be omitted as needed without changing the scope of essence of the present disclosure.

The processor 2480, as a control center of the mobile phone, connects various parts of the mobile phone via various interfaces and lines. The processor 2480 performs various types of functions and data processing of the mobile phone through running or executing software programs and/or modules stored in the memory 2420 and calling the data stored in the memory 2420, to monitor the whole mobile phone. Optionally, the processor 2480 may include one or more processing units. Preferably, an application processor and a modem processor may be integrated into the processor 2480. The application processor mainly processes an operating system, a user interface and an application, etc. The modem processor mainly processes wireless communications. It should be understood that the above-described modem processor may not be integrated into the processor 2480.

The mobile phone further includes the power supply 2490 (e.g., a battery) for supplying power to various components. Preferably, the power supply may be logically connected to the processor 2480 through a power management system, thereby achieving functions such as charge management, discharge management and power consumption management through the power management system.

Although not shown, the mobile phone may include a camera and a Bluetooth module, etc., which are not described in detail here.

In the embodiment of the present disclosure, the processor 2480 included in the terminal has a function of controlling to perform the video sharing method and the video playing method performed by the terminal.

It should be noted that the device embodiment described above is only illustrative, where the unit described as a separate component may be separated physically or not, and the components displayed as the units may be physical units or not. That is, the components may be located in one place, or may be distributed onto multiple network units. A part or all of the modules may be selected according to the actual need to realize the object of the solution of the embodiment. In addition, in the drawings of the device embodiments according to the present disclosure, a connection relationship between modules indicate that there is communication connection between the modules, which may be realized as one or more communication buses or signal lines.

Through the description of the above implementation, those skilled in the art can clearly understand that the present disclosure may be realized by using software in combination with necessary general-purpose hardware, and may also be realized through the special hardware including an application specific integrated circuit, a dedicated CPU, a dedicated memory, and a dedicated device and so on. In general, functions achieved by the computer programs can be easily implemented by corresponding hardware, and concrete hardware configured to achieve the same function may have multiple structures, such as an analog circuit, a digital circuit or a dedicated circuit. However, the present disclosure can be implemented by the software program in some embodiments. Based on such understanding, the essence part or the part contributing to the conventional technology in the technical solutions of the present disclosure can be reflected in a form of a software product. The computer software product is stored in a readable storage medium, such as a computer floppy disk, a USB flash disk, a mobile hard disk, a Read-Only Memory (ROM), a Random Access Memory (RAM), a magnetic disk or an optical disk, and includes several instructions to enable a computer device (which may be a personal computer, a server, or a network device) to perform the methods described in the embodiments of the present disclosure.

In summary, the embodiments described above are only used to illustrate the technical solutions of the present disclosure rather than limit the present disclosure. Although the present disclosure is described in detail with reference to the embodiments described above, those skilled in the art should understand that the technical solutions recorded in the embodiments may be changed, or a part of technical features in the technical solutions may be replaced equivalently. The changes or replacements are encompassed by the spirit and scope of the technical solutions of the embodiments of the present disclosure.

The invention claimed is:

1. A video sharing method performed by an electronic device having one or more processors and a memory storing programs to be executed by the one or more processors, the method comprising:
    acquiring a video segment;
    acquiring a remark trigger position corresponding to play progress of the video segment;
    acquiring remark content corresponding to the remark trigger position; and
    sharing the video segment, the remark trigger position and the remark content with a receiving terminal, wherein the remark content is displayed in a playing picture of the video segment or is played in a form of sound based on the receiving terminal playing the video segment to the remark trigger position,
    wherein the acquiring the video segment comprises:
    receiving a video segmenting instruction comprising a segmenting start time point, a segmenting end time point and a video segmenting area delimited in a play interface;
    acquiring, during a period from the segmenting start time point to the segmenting end time point, decoded video data corresponding to the video segmenting area in a being-played-video file in response to the video segmenting instruction; and
    performing file format encoding on the acquired decoded video data to generate the video segment,
    wherein the acquiring the decoded video data corresponding to the video segmenting area in the being-played-video file in response to the video segmenting instruction comprises:
    calculating an offset position between the video segmenting area and the play interface, wherein the play interface is a rectangular box, the video segmenting area is a rectangular box, and the offset position refers to offset positions of four corners of the video segmenting area relative to four corners of the play interface;
    determining, based on the offset position, a coordinate mapping relationship between the video segmenting area and a video image in the being-played-video file; and
    reading, based on the coordinate mapping relationship, the decoded video data corresponding to the video segmenting area.

2. The method according to claim 1, wherein the acquiring the remark trigger position corresponding to the play progress of the video segment comprises:
    displaying a play time axis corresponding to the play progress of the video segment;
    detecting an action point acted on the play time axis; and
    acquiring the remark trigger position based on a position of the action point on the play time axis.

3. The method according to claim 2, wherein the acquiring the video segment comprises:
    receiving a video segmenting instruction comprising a segmenting start time point, a segmenting end time point and a video segmenting area delimited in a play interface;
    acquiring, during a period from the segmenting start time point to the segmenting end time point, decoded video data corresponding to the video segmenting area in a being-played-video file in response to the video segmenting instruction; and
    performing file format encoding on the acquired decoded video data to generate the video segment.

4. The method according to claim 1, wherein the video segmenting instruction further comprises a target file format, and the performing the file format encoding on the acquired decoded video data comprises:
    encoding the acquired decoded video data into a video segment meeting the target file format, wherein the video segment comprises file header information, and the file header information comprises attribute information on the video segment.

5. The method according to claim 1, wherein the video segmenting instruction further comprises a target resolution, and before the performing the file format encoding on the acquired decoded video data, the method further comprises:
    calculating a resolution mapping value by using the coordinate mapping relationship and an original resolution of a video image in a video file corresponding to the acquired decoded video data;
    determining whether the resolution mapping value is the same as the target resolution; and
    scaling the video image in the video file corresponding to the acquired decoded video data, based on the resolution mapping value being different from the target resolution.

6. The method according to claim 1, wherein the video segmenting instruction further comprises a target video format, and before the performing the file format encoding on the acquired decoded video data in response to the video segmenting instruction, the method further comprises:
    determining whether an original video format of a video file corresponding to the acquired decoded video data is the same as the target video format; and
    converting the video format of the video file corresponding to the acquired decoded video data to obtain acquired decoded video data having the target video format, based on the original video format being different from the target video format.

7. The method according to claim 1, wherein the video segmenting instruction further comprises a target video quality, and before the performing the file format encoding on the acquired decoded video data in response to the video segmenting instruction, the method further comprises:
    determining whether an original video quality of a video file corresponding to the acquired decoded video data is the same as the target video quality; and
    adjusting the video quality of the video file corresponding to the acquired decoded video data to obtain acquired decoded video data having the target video quality, based on the original video quality being different from the target video quality.

8. The method according to claim 1, wherein the video segmenting instruction further comprises a target video frame rate, and before the performing the file format encoding on the acquired decoded video data in response to the video segmenting instruction, the method further comprises:
    determining whether an original video frame rate of a video file corresponding to the acquired decoded video data is the same as the target video frame rate; and
    adjusting the video frame rate of the video file corresponding to the acquired decoded video data to obtain acquired decoded video data having the target video frame rate, based on the original video frame rate being different from the target video frame rate.

9. The method according to claim 1, further comprising:
    acquiring output configuration information on the remark content corresponding to the remark trigger position.

10. The method according to claim 9, wherein based on the remark content comprising a visual element, the output configuration information on the remark content comprises a display position of the visual element in the playing picture of the video segment, wherein the visual element comprises at least one of a graphic marker, a text, and an icon.

11. The method according to claim 10, wherein the acquiring the video segment comprises:
    receiving a video segmenting instruction comprising a segmenting start time point, a segmenting end time point and a video segmenting area delimited in a play interface;
    acquiring, during a period from the segmenting start time point to the segmenting end time point, decoded video data corresponding to the video segmenting area in a being-played-video file in response to the video segmenting instruction; and
    performing file format encoding on the acquired decoded video data to generate the video segment.

12. The method according to claim 9, further comprising:
    playing the video segment;
    displaying the remark content or playing the remark content in the form of sound according to the output configuration information on the remark content, based on the play progress of the video segment reaching the remark trigger position;
    beginning to obtain a time period based on the remark content being displayed or played in the form of sound; and
    stopping displaying the remark content or playing the remark content in the form of sound, based on the time period reaching an output time period for the remark content comprised in the output configuration information on the remark content.

13. The method according to claim 9, wherein the acquiring the video segment comprises:
    receiving a video segmenting instruction comprising a segmenting start time point, a segmenting end time point and a video segmenting area delimited in a play interface;
    acquiring, during a period from the segmenting start time point to the segmenting end time point, decoded video data corresponding to the video segmenting area in a being-played-video file in response to the video segmenting instruction; and
    performing file format encoding on the acquired decoded video data to generate the video segment.

14. The method according to claim 9 wherein the sharing the video segment, the remark trigger position and the remark content with the receiving terminal comprises:
    sharing the video segment, the remark trigger position, the remark content and the output configuration information on the remark content with the receiving terminal, wherein the remark content is displayed in the playing picture of the video segment or is played in the form of sound according to the output configuration information on the remark content when the receiving terminal plays the video segment to the remark trigger position.

15. The method according to claim 14, wherein the acquiring the video segment comprises:
    receiving a video segmenting instruction comprising a segmenting start time point, a segmenting end time point and a video segmenting area delimited in a play interface;
    acquiring, during a period from the segmenting start time point to the segmenting end time point, decoded video data corresponding to the video segmenting area in a being-played-video file in response to the video segmenting instruction; and
    performing file format encoding on the acquired decoded video data to generate the video segment.

16. A video sharing device comprising a processor and a storage medium storing computer executable instructions, wherein when the processor executes the computer executable instructions, the processor performs operations comprising:
    acquiring a video segment;
    acquiring a remark trigger position corresponding to play progress of the video segment;
    acquiring remark content corresponding to the remark trigger position; and
    sharing the video segment, the remark trigger position and the remark content with a receiving terminal, wherein the remark content is displayed in a playing picture of the video segment or is played in a form of sound based on the receiving terminal playing the video segment to the remark trigger position,
    wherein acquiring the video segment comprises:
    receiving a video segmenting instruction comprising a segmenting start time point, a segmenting end time point and a video segmenting area delimited in a play interface;
    acquiring, during a period from the segmenting start time point to the segmenting end time point, decoded video data corresponding to the video segmenting area in a being-played-video file in response to the video segmenting instruction; and
    performing file format encoding on the acquired decoded video data to generate the video segment,
    wherein acquiring the decoded video data corresponding to the video segmenting area in the being-played-video file in response to the video segmenting instruction comprises:

calculating an offset position between the video segmenting area and the play interface, wherein the play interface is a rectangular box, the video segmenting area is a rectangular box, and the offset position refers to offset positions of four corners of the video segmenting area relative to four corners of the play interface;

determining, based on the offset position, a coordinate mapping relationship between the video segmenting area and a video image in the being-played-video file; and reading, based on the coordinate mapping relationship, the decoded video data corresponding to the video segmenting area.

17. The device according to claim 16, wherein, the processor performs the operation of acquiring the video segment comprises the processor performs operations comprising:

receiving a video segmenting instruction comprising a segmenting start time point, a segmenting end time point and a video segmenting area delimited in a play interface;

acquiring, during a period from the segmenting start time point to the segmenting end time point, decoded video data corresponding to the video segmenting area in a being-played-video file in response to the video segmenting instruction; and performing file format encoding on the acquired decoded video data to generate the video segment.

* * * * *